(12) United States Patent
Garge et al.

(10) Patent No.: US 12,098,730 B2
(45) Date of Patent: Sep. 24, 2024

(54) COMPRESSOR

(71) Applicant: Cummins LTD

(72) Inventors: Tejas Garge, London (GB); Rohan Kulkami, London (GB); Vidyesh Bobade, London (GB); Siddharth Sane, London (GB); Vivek Mehta, London (GB)

(73) Assignee: CUMMINS LTD, London (GB)

( * ) Notice: Subject to any disclaimer, the term of this patent is extended or adjusted under 35 U.S.C. 154(b) by 0 days.

(21) Appl. No.: 18/265,196

(22) PCT Filed: Dec. 3, 2021

(86) PCT No.: PCT/GB2021/053175
§ 371 (c)(1),
(2) Date: Jun. 2, 2023

(87) PCT Pub. No.: WO2022/118042
PCT Pub. Date: Jun. 9, 2022

(65) Prior Publication Data
US 2024/0068487 A1    Feb. 29, 2024

(30) Foreign Application Priority Data
Dec. 4, 2020   (WO) .................. PCT/EP2020/084745

(51) Int. Cl.
*F04D 29/44* (2006.01)
*B33Y 80/00* (2015.01)
(Continued)

(52) U.S. Cl.
CPC ............ *F04D 29/444* (2013.01); *B33Y 80/00* (2014.12); *F01D 15/08* (2013.01); *F04D 17/10* (2013.01)

(58) Field of Classification Search
CPC .................................................... F04D 29/444
See application file for complete search history.

(56) References Cited

U.S. PATENT DOCUMENTS

| 2,977,042 | A | 3/1961 | Kurt |
| 3,825,368 | A | 7/1974 | Benjamin |

(Continued)

FOREIGN PATENT DOCUMENTS

| CN | 101629584 A | 1/2010 |
| DE | 1053714 B | 3/1959 |

(Continued)

OTHER PUBLICATIONS

International Search Report and Written Opinion for International Patent Application No. PCT/GB2021/053175, filed Dec. 3, 2021, mailed Mar. 2, 2022.

(Continued)

*Primary Examiner* — Justin D Seabe
(74) *Attorney, Agent, or Firm* — Faegre Drinker Biddle & Reath LLP

(57) ABSTRACT

A vane arrangement for a compressor is disclosed. The vane arrangement comprises a generally annular vane deck and at least one vane. The generally annular vane deck extends at least partway around a longitudinal axis, defining a deck thickness b in the axial direction. The at least one vane projects from a first surface of the vane deck. The at least one vane comprises a leading edge, a trailing edge, and first and second pressure surfaces. The leading edge is proximate the longitudinal axis. The trailing edge is distal the longitudinal axis. The first and second pressure surfaces extend between the leading edge and the trailing edge. The at least one vane defines a neck thickness t, proximate the leading edge, in a plane normal to the longitudinal axis, wherein $t/b \geq$ about 0.21.

23 Claims, 19 Drawing Sheets

(51) Int. Cl.
*F01D 15/08* (2006.01)
*F04D 17/10* (2006.01)

(56) References Cited

U.S. PATENT DOCUMENTS

| | | | |
|---|---|---|---|
| 3,973,872 A | | 8/1976 | Seleznev |
| 5,529,457 A | | 6/1996 | Terasaki et al. |
| 6,168,375 B1 | | 1/2001 | LaRue |
| 6,264,424 B1 | | 7/2001 | Fuller |
| 7,442,006 B2 | | 10/2008 | Nguyen et al. |
| 9,222,485 B2 * | | 12/2015 | Brown .................. F04D 29/444 |
| 10,718,222 B2 | | 7/2020 | King et al. |
| 2010/0129204 A1 * | | 5/2010 | Higashimori ......... F04D 29/462 |
| | | | 415/148 |
| 2013/0000300 A1 | | 1/2013 | O'Hara |
| 2013/0280060 A1 * | | 10/2013 | Nasir .................... F04D 29/444 |
| | | | 415/208.2 |
| 2016/0281734 A1 | | 9/2016 | Musgrave |
| 2016/0325501 A1 | | 11/2016 | Ready |
| 2018/0171825 A1 | | 6/2018 | Hossbach |
| 2018/0274376 A1 * | | 9/2018 | King ........................ B22F 5/10 |

FOREIGN PATENT DOCUMENTS

| | | |
|---|---|---|
| DE | 102016125189 A1 | 6/2018 |
| DE | 102017122524 A1 | 3/2019 |
| EP | 3611346 A1 | 2/2020 |
| FR | 3048017 A | 8/2017 |
| GB | 644031 A | 10/1950 |
| GB | 593031 A | 10/1974 |
| JP | H08312590 A | 11/1996 |
| KR | 20180120704 A | 11/2018 |
| WO | 2011011335 A1 | 1/2011 |
| WO | WO-2016088690 A1 * | 6/2016 .............. F02B 39/00 |

OTHER PUBLICATIONS

International Preliminary Report on Patentability for International Patent Application No. PCT/EP2020/084745, filed Dec. 4, 2020, mailed May 30, 2023.

International Search Report and Written Opinion for International Patent Application No. PCT/EP2020/084745, filed Dec. 4, 2020, mailed Sep. 1, 2021.

International Preliminary Report on Patentability for International Patent Application No. PCT/GB2021/053159, filed Dec. 3, 2021, mailed May 30, 2023.

International Preliminary Report on Patentability for International Patent Application No. PCT/GB2021/053175, filed Dec. 3, 2021, mailed May 30, 2023.

International Search Report and Written Opinion for International patent application No. PCT/US2021/053159, filed Dec. 3, 2021, mailed Feb. 24, 2022.

* cited by examiner

| Reference Code | Pi1 | Pi2 |
|---|---|---|
| Baseline | 0.09 | 4.80 |
| Non-opt | 0.21 | 13.27 |
| Non-opt | 0.21 | 11.64 |
| Acceptable | 0.30 | 17.82 |
| Acceptable | 0.30 | 16.72 |
| Non-opt | 0.38 | 20.90 |
| Concept 2 | 0.30 | 18.65 |
| Concept 1 | 0.21 | 12.06 |
| Non-opt | 0.38 | 24.56 |
| Concept 3 | 0.36 | 23.39 |

Figure 19

| Desirable Zone | | |
|---|---|---|
| $\pi_1$ | 0.27 | 0.37 |
| $\pi_2$ | 16 | 24 |

Figure 20

| Desirable Zone | | |
|---|---|---|
| $\pi_1/d$ | Greater than 0.0018 OR between 0.0018-0.0025 | |
| $\pi_2/d$ | 0.10 | 0.16 |

Figure 21

| Desirable Zone 1 | | |
|---|---|---|
| $\pi_1$ | 0.27 | 0.32 |
| $\pi_2$ | 16 | 23 |

| Desirable Zone 2 | | |
|---|---|---|
| $\pi_1$ | 0.32 | 0.37 |
| $\pi_2$ | 17 | 24 |

| Vane design | Neck thickness $t$ (mm) | Leading edge angle $\phi$ (deg) | Deck thickness $b$ (mm) | Cos $\phi$ | Chord length $l$ (mm) | Efficency | SSR | $Pi_1$ | $Pi_2$ |
|---|---|---|---|---|---|---|---|---|---|
| Design A | 0.64 | 74.51 | 3 | 0.267 | 77.8 | 79.92 | 1.19 | 0.21 | 13.27 |
| Design B | 0.64 | 76.51 | 3 | 0.233 | 78.1 | 76.64 | 1.19 | 0.21 | 11.64 |
| Design C | 0.89 | 75.01 | 3 | 0.258 | 77.3 | 78.47 | 1.25 | 0.30 | 17.82 |
| Design D | 0.89 | 76.01 | 3 | 0.242 | 77.6 | 77.71 | 1.25 | 0.30 | 16.72 |
| Design E | 1.15 | 76.51 | 3 | 0.233 | 78.1 | 76.57 | 1.22 | 0.38 | 20.90 |
| Concept 2 | 0.89 | 74.01 | 3 | 0.275 | 75.9 | 80.15 | 1.23 | 0.30 | 18.65 |
| Baseline | 0.26 | 76.01 | 3 | 0.242 | 75.5 | 80.29 | 0.95 | 0.09 | 4.80 |
| Concept 1 | 0.64 | 75.4 | 3 | 0.252 | 74.9 | 80.16 | 1.20 | 0.21 | 12.06 |
| Design F | 1.15 | 73.51 | 3 | 0.284 | 75.7 | 80.04 | 1.22 | 0.38 | 24.56 |
| Concept 3 | 1.08 | 73.2 | 3 | 0.289 | 74.9 | 80.28 | 1.25 | 0.36 | 23.39 |
| Design G | 0.26 | 76.01 | 6 | 0.242 | 75.5 | 80.29 | 0.65 | 0.04 | 4.80 |
| Design H | 0.64 | 75.4 | 6 | 0.252 | 74.9 | 80.16 | 0.92 | 0.11 | 12.06 |

Figure 26

COMPRESSOR

CROSS-REFERENCE TO RELATED APPLICATION

This application claims the priority benefit of International Patent Application No. PCT/GB2021/053175, Dec. 3, 2021, which claims priority to International Patent Application No. PCT/EP2020/084745, Dec. 4, 2020, the entire contents and disclosures of which are incorporated herein by reference.

The present invention relates to a vane arrangement, compressor, vane insert, compressor cover, turbocharger and associated methods.

Compressors receive fluid, such as air, via an inlet, and exhaust pressurised fluid via an outlet. Provided between the inlet and outlet is a compressor wheel, supported for rotation on a shaft. The compressor wheel does work on the fluid, by virtue of the shaft being driven, to increase the pressure of the fluid.

It is known to incorporate vanes, by way of a vane insert, in a compressor. The vanes facilitate the recovery of static pressure in the compressor stage, increasing the efficiency of the compressor. The flow velocity, across the vanes, may generally be reduced, reducing the total pressure whilst increasing the static pressure of the flow (otherwise referred to as recovering static pressure from the flow).

One such use of a compressor is in a turbocharger. Turbochargers are well known devices for supplying air to the intake of an internal combustion engine at pressures above atmospheric pressure (boost pressures). A conventional turbocharger comprises an exhaust gas driven turbine wheel mounted on a rotatable shaft within a turbine housing. Rotation of the turbine wheel rotates the compressor wheel mounted on the other end of the shaft within the compressor cover. The compressor wheel delivers compressed air to the intake manifold of the engine, thereby increasing engine power.

The turbocharger shaft is conventionally supported by journal and thrust bearings, including appropriate lubricating systems, located within a central bearing housing connected between the turbine and compressor.

Existing vanes are designed to be as thin as possible at the leading edge to minimise incidence losses. However, these vanes may suffer from an undesirably short lifespan due to failure, for example by thermomechanical fatigue, because of their thin leading edge (which reduces their strength). Modification of the vane design by increasing the thickness at the leading edge risks reducing the performance of the compressor which incorporates the vanes.

There exists a need to provide an alternative vane arrangement which overcomes one or more of the disadvantages of known vanes, whether mentioned in this document or otherwise.

According to a first aspect of the invention there is provided a vane arrangement for a compressor, the vane arrangement comprising:

a generally annular vane deck, extending at least partway around a longitudinal axis, defining a deck thickness b in the axial direction; and at least one vane which projects from a first surface of the vane deck, the at least one vane comprising:
 a leading edge proximate the longitudinal axis;
 a trailing edge distal the longitudinal axis; and
 first and second pressure surfaces which extend between the leading edge and the trailing edge;

wherein the at least one vane defines a neck thickness t, proximate the leading edge, in a plane normal to the longitudinal axis; and wherein $$\frac{t}{b} \geq \text{about } 0.21.$$

The vane arrangement may form part of a vane insert. Alternatively, the vane arrangement may form part of a compressor cover (being integrally formed therewith).

The vane arrangement may be receivable by, or engageable by, a compressor cover of the compressor. The vane arrangement may be for a centrifugal (e.g. radial) compressor.

The vane arrangement may be located between an inlet and an outlet of the compressor. The vane arrangement may be disposed in a generally radially extending channel. The generally radially extending channel may be described as a diffuser passage, or diffuser channel. The vane arrangement may be described as a diffuser vane arrangement. The generally radially extending channel may be disposed between a compressor wheel (specifically a downstream end thereof) and a generally toroidal volute. The passage may be described as extending outwardly from the longitudinal axis.

The vane deck may be described as plate-like. The vane deck may form part of a backplate. The backplate may further comprise one or more mounting projections, in the form of one or more mounting rims or flanges and/or sealing projections. The mounting projections and/or sealing projections may extend beyond the vane deck radially and/or axially. That is to say, the vane deck may define an annular portion of the backplate which is partly recessed relative to mounting projections. The vane deck may be said to be bound by one or more mounting projections and/or sealing projections. The vane deck may be said to occupy at least an annular portion of the vane backplate from which the at least one vane extends. Put another way, the vane deck may be defined at least between a leading edge, and a trailing edge, of the at least one vane. The vane deck may define an axially thinnest, or most shallow, portion of the vane arrangement. The deck thickness b may define an axially thinnest, or most shallow, portion of the vane arrangement. The deck thickness b may be at least 1.5 mm. The deck thickness b may be up to around 6 mm. The deck thickness b may be between around 2 mm and around 6 mm.

The vane deck may extend entirely around the longitudinal axis (e.g. so as to form a closed loop). Alternatively, the vane deck may extend only partway around the longitudinal axis.

The at least one vane may be described as a diffuser vane. The at least one vane may be described as an aerofoil, and may have a NACA profile. The at least one vane may be entirely arcuate. The at least one vane may comprise linear portions. The at least one vane may advantageously influence the fluid flow, which passes across the vane arrangement, to improve the efficiency of a turbomachine, such as a compressor, in which the vane arrangement is incorporated. This may be by way of imparting a swirl to the flow, or facilitating static pressure recovery. The flow velocity may generally be reduced, reducing the total pressure whilst increasing the static pressure of the flow (otherwise referred to as recovering static pressure from the flow). This advantageously means that less 'work' is required from a volute with respect to recovering static pressure from the flow.

The at least one vane may have a substantially uniform profile. Described another way, the cross-sectional shape of the vane may be substantially the same along an axial length, or extent, of the vane. Each vane may have a substantially uniform profile. A fillet may extend between the vane and the first surface of the vane deck. The vane may be described as a non-twisting vane in that it may not twist about the axial direction in which it extends. Described another way, a footprint defined by a profile of the vane may be constant (e.g. not rotate or translate) along an entire extent of the vane.

The at least one vane may project parallel to the longitudinal axis (from the vane deck). The at least one vane may project axially. Alternatively, the at least one vane may extend generally towards the longitudinal axis, but at a relative angle thereto (e.g. at 5° thereto).

In use, fluid flow may be bound, through a generally radial passage, by the first surface of the vane deck. The first surface of the vane deck may be described as an exposed surface of the vane deck.

The leading edge being proximate the longitudinal axis may otherwise be described as the leading edge being provided towards, or at, a radially inner position on the vane deck. The leading edge may be a point on an outline of a cross-section of the at least one vane. The leading edge refers to an upstream edge of the vane at a point where a camber line passes through a profile of the vane. The leading edge may be defined, at least in part, by a fillet. The leading edge may be defined by a fillet.

The trailing edge being distal the longitudinal axis may otherwise be described as the leading edge being provided towards, or at, a radially outer position on the vane deck.

The trailing edge may be a point, or a portion of a line, on an outline of a cross-section of the at least one vane. The trailing edge may have a thickness (e.g. where the trailing edge is an arc, or line).

The first and second pressure surfaces may be referred to as suction and pressure surfaces respectively. The first pressure surface may be described as being generally distal the longitudinal axis and/or compressor impeller. The second pressure surface may be described as generally proximate the longitudinal axis and/or compressor impeller. The first and second pressure surfaces may be referred to as first and second surfaces, or upper and lower surfaces, respectively. The first and/or second surfaces may be entirely arcuate. The first and/or second surfaces may comprise a linear portion.

The neck thickness t refers to a width of the vane (e.g. offset between the first and second pressure surfaces perpendicular to a point on the camber line) at the widest point of a fillet, or rounded or sharpened geometry, which defines the leading edge, proximate the leading edge. Put another way, the neck thickness t refers to a width of the vane, at a point on the camber line, where the first and second pressure surfaces transition from a generally linear to an arcuate geometry in a plane normal to the longitudinal axis (proximate the leading edge). The neck thickness t may be described as a thickness taken at a point, proximate the leading edge, where a leading edge fillet begins. Where the leading edge of the vane, and proximate regions of the first and second pressure surfaces, defines at least part of a generally lozenge-like geometry (e.g. two linear portions connected by an arcuate, or rounded, end), the neck thickness t may be described as a diameter of the rounded end of the lozenge. Where a profile defining the leading edge is elliptical, the neck thickness may be described as a minor diameter of the ellipse. The neck thickness t may be at least around 0.5 mm, and preferably at least around 0.6 mm. The neck thickness t may be up to around 1.5 mm, and preferably up to around 1.2 mm. The neck thickness t is preferably between around 0.8 mm and around 1.1 mm.

t/b may be referred to as a durability term. In some embodiments, $$\frac{t}{b} \geq \text{about } 28,$$

about 0.29 or about 0.30.

$$\frac{t}{b} \geq \text{about } 0.21$$

has been found to provide desirable durability characteristics. In particular, vane arrangements having $$\frac{t}{b} \geq \text{about } 0.21$$

have demonstrated desirable thermomechanical fatigue performance from simulation data.

The neck thickness t defines the neck thickness in millimetres (mm). The deck thickness b defines the deck thickness in millimetres (mm).

Optionally, $$\frac{t}{b} \geq 0.21.$$

In some embodiments, $$\frac{t}{b} \geq 0.28, 0.29 \text{ or } 0.30.$$

Optionally, about $$0.21 \leq \frac{t}{b} \leq \text{about } 0.38.$$

Designs falling within the aforementioned range can be most reliably predicted using the model described herein.

Optionally, $$0.21 \leq \frac{t}{b} \leq 0.38.$$

Optionally $$\frac{t}{b} \geq \text{about } 0.27,$$

preferably $$\frac{t}{b} \geq 0.27.$$

Optionally about $$0.27 \leq \frac{t}{b} \leq \text{about } 0.37,$$

preferably $$0.27 \leq \frac{t}{b} \leq 0.37.$$

The at least one vane may define:
a camber line being defined between the leading edge and trailing edge; and
a chord length l;
wherein the leading edge defines a leading edge angle $\emptyset$; and
wherein: about 11≤t(l cos $\emptyset$) about 25.

The camber line refers to a line joining the leading and trailing edges, and which is equidistant from the first and second pressure surfaces. The camber line is therefore indicative of the vane geometry. The camber line extends between the leading and trailing edges of the at least one vane. Where the trailing edge, for example, has a thickness (e.g. it is of the form of an arc, or generally flat surface), the camber line extends to a midpoint of the trailing edge. The midpoint of the trailing edge is defined as a point along a trailing edge 'thickness' which is equidistant from first and second pressure surfaces. It will be appreciated that there is a separate camber line for each respective vane.

The chord length/refers to the straight line distance between the leading and trailing edges. Where either of the leading or trailing edges have a thickness (e.g. they are not a point per se) the chord length extends between midpoints of said leading and trailing edge 'thicknesses'. The chord length l may be described as the linear offset between the leading and trailing edges. The chord length l may be at least around 25 mm, more preferably at least around 70 mm, and more preferably at least around 74 mm. The chord length/ may be up to around 100 mm, and more preferably up to around 80 mm, and more preferably up to around 79 mm. The chord length l may be between around 74.9 mm and around 78.1 mm. It will be appreciated that the chord length l may scale with compressor wheel diameter d. For example, a longer (e.g. greater) chord length l may be used for a larger compressor wheel diameter d.

The leading edge angle $\emptyset$ is an angle defined between a tangent (a camber line tangent) and a radial vector passing through the leading edge, and taken in the plane normal to the longitudinal axis. The camber line tangent is a tangent of the camber line at the leading edge. The camber line tangent extends from the leading edge of the at least one vane in a direction generally away from the longitudinal axis. The radial vector extends through the leading edge, radially outwardly relative to the longitudinal axis. The leading edge angle $\emptyset$ can otherwise be described as the angle which the camber line makes, at the leading edge, to the radial direction.

The leading edge angle $\emptyset$ is defined between the camber line tangent, in a direction moving from the leading edge towards the trailing edge of the at least one vane, and the radial vector, moving from a radially inner position to a radially outer position, when viewed facing the first surface of the vane deck. Put another way, the relevant leading edge angle $\emptyset$ may be provided at a top right, or first, quadrant, where the at least one vane extends in a generally clockwise direction (and where viewed facing the first surface of the vane deck).

The leading edge angle $\emptyset$ may be described as an angle of inclination of the camber line, in the plane normal to the longitudinal axis, at the leading edge, relative to the radial vector extending through the leading edge. The leading edge angle $\emptyset$ may be at least around 70 degrees, and more preferably at least around 73 degrees. The leading edge angle $\emptyset$ may be up to around 80 degrees, and more preferably up to around 77 degrees. The leading edge angle $\emptyset$ may be between around 73.2 degrees and around 78.1 degrees.

t(l cos $\emptyset$) may be referred to as a performance, or performance trade-off, term. l cos $\emptyset$ may be at least around 15, and preferably at least around 17. l cos $\emptyset$ may be up to around 25.

The chord length l defines the chord length in millimetres (mm). The leading edge angle $\emptyset$ defines the angle in degrees.

Particularly advantageous combinations of t/b and t(l cos $\emptyset$) values, respectively, defining specific vane arrangement embodiments, include:

(0.30, 18.65); (0.36, 23.39); (0.30, 16.72); and (0.30, 17.82). Further advantageous embodiments include: (0.21, 13.27); (0.21, 11.64); (0.38, 20.90); (0.21, 12.06); (0.38; 24.56) and (0.36; 23.39).

Advantageously, vane arrangements having the ratio about 11≤t(l cos $\emptyset$)≤about 25, and preferably about 16≤t(l cos $\emptyset$)≤about 24, have been found to provide a desirably high efficiency when incorporated in a compressor. Furthermore, vane arrangements having $$\frac{t}{b} \geq \text{about } 0.21$$

and about 11≤t(l cos $\emptyset$)≤about 25, and particular where $$\frac{t}{b} \geq \text{about } 0.27$$

and about 16≤t(l cos $\emptyset$)≤about 24, have been found to provide a desirable balance of both aerodynamic performance and durability. That is to say, vane arrangements having variables falling in these ranges provides a desirable level of efficiency in combination with a desirable durability (e.g. in the form of thermomechanical fatigue performance).

Previous methods used to design vanes have failed to consider, or establish, a direct link between durability and performance. Furthermore, an iterative process has previously been required in order to develop vane geometries. After complex, lengthy and costly iterations, a preferred vane geometry has previously been selected on the basis of what design meets the requirements specific to an associated brief. By deriving the $\pi_1$ and $\pi_2$ terms, and by identifying ranges of desirable values of the same, the inventors have streamlined the vane design process and can thus avoid the need for iterative design processes in the future. By being representative of durability and performance, assessing the $\pi_1$ and $\pi_2$ terms associated with a vane design, and confirming they fall within the desirable ranges identified by the inventors, provides a reliable indication of the durability and performance of the vane design without requiring further analysis and/or iterative design. The design process is thus made less complex and costly, and brevity is improved.

In some embodiments, the ranges may be further refined as: $0.27 \leq \pi_1 \leq 0.32$, and $16 \leq \pi_2 23$; and $0.32 \pi_1 0.37$, and $17 \leq \pi_2 \leq 24$. Expressed another way, the following portions of the broad range may be excluded, or disclaimed, in some embodiments:

$0.27 \leq \pi_1 < 0.32$, and $23 < \pi_2 \leq 24$; and
$0.32 < \pi_1 \leq 0.37$, and $16 \leq \pi_2 < 17$.

Optionally, $11 \leq t(1 \cos \emptyset) \leq 25$. Optionally, about $16 \leq t(1 \cos \emptyset) \leq$ about 24, preferably $16 \leq t(1 \cos \emptyset) \leq 24$.

According to a second aspect of the invention there is provided a compressor, the compressor comprising:
- a compressor cover;
- a compressor wheel defining a wheel diameter d, the compressor wheel being rotatable about the longitudinal axis and received by the compressor cover; and
- the vane arrangement according to the first aspect of the invention;

wherein $$\frac{t}{bd} \geq \text{about } 0.0014.$$

The compressor may be a centrifugal, or radial, compressor. The compressor may have an axial inlet. The compressor may have a generally tangential outlet. The compressor may extend around the longitudinal axis. The compressor wheel does work on a fluid to increase a pressure of the fluid. The fluid may be air.

The compressor may be for a turbomachine, such as a turbocharger. The compressor may, for example, be a fuel cell compressor.

The compressor cover may be referred to as a compressor housing. The compressor cover generally surrounds the compressor wheel. The compressor cover may engage an adjacent support member to define a wheel cavity. The support member may be a bearing housing or a seal plate. The compressor cover may define a volute. The volute may be generally toroidal. The volute may have a cross-sectional area which increases around the longitudinal axis. The cross-sectional area of the volute may increase linearly around the longitudinal axis. The compressor cover may define an inlet (which may be axial) and a downstream outlet (which may be generally tangential). A generally radial passage may interpose the inlet and the outlet. The radial passage may be described as a diffuser passage. The vane arrangement may be provided proximate, or within, the generally radial passage. The vane arrangement may define, at least in part, the generally radial passage.

The compressor wheel may comprise a plurality of blades. The plurality of blades may be attached to a base of compressor wheel. The compressor wheel may comprise a bore. The bore may be configured to receive a fastener. The fastener may be configured to couple the compressor wheel to a shaft.

The wheel diameter d refers to a diameter at an outermost radial point of the blades of the compressor wheel (at the trailing edge of the compressor wheel). The wheel diameter d is typically lower than an outermost diameter of the entire compressor wheel. The wheel diameter d may be described as an impeller diameter, or an outer blade diameter. The wheel diameter d is measured in millimetres (mm).

The vane arrangement may be provided downstream of the compressor wheel. The vane arrangement may be provided downstream of a radially outermost tip of the compressor wheel.

t/bd may be referred to as a durability term parameterised with respect to wheel diameter.

The neck thickness t defines the neck thickness in millimetres (mm). The deck thickness b defines the deck thickness in millimetres (mm).

Compressors having vane arrangements wherein $$\frac{t}{bd} \geq \text{about } 0.0014,$$

preferably $$\frac{t}{bd} \geq \text{about } 0.0018,$$

advantageously provide desirable durability performance (e.g. mechanical fatigue performance) and take into account the wheel diameter of the compressor wheel. Advantageously, the desirable ranges of values can thus be applied to a range of different sizes of compressor (by virtue of incorporating the compressor wheel diameter d term).

Optionally, $$\frac{t}{bd} \geq \text{about } 0.0014.$$

Optionally, about $$0.0014 \leq \frac{t}{bd} \leq \text{about } 0.0026.$$

Optionally, $$0.0014 \leq \frac{t}{bd} \leq 0.0026.$$

Optionally $$\frac{t}{bd} \geq \text{about } 0.0018,$$

preferably $$\frac{t}{bd} \geq 0.0018.$$

Optionally about $$0.0018 \leq \frac{t}{bd} \leq \text{about } 0.0025,$$

preferably $$0.0018 \leq \frac{t}{bd} \leq 0.0025.$$

Designs falling within the aforementioned range can be most reliably predicted using the model described herein.

Optionally, about $$0.069 \leq \frac{t(l \cos \emptyset)}{d} \leq \text{about } 0.17.$$

Optionally, $$0.069 \leq \frac{t(l \cos \emptyset)}{d} \leq \text{about } 0.17.$$

Optionally, about $$0.1 \leq \frac{t(l \cos \emptyset)}{d} \leq \text{about } 0.16.$$

Optionally, $$0.1 \leq \frac{t(l \cos \emptyset)}{d} \leq 0.16.$$

According to a third aspect of the invention there is provided a vane arrangement for a compressor, the vane arrangement comprising:
- a generally annular vane deck, extending at least partway around a longitudinal axis; and
- at least one vane which projects from a first surface of the vane deck, the at least one vane comprising:
  - a leading edge proximate the longitudinal axis, the leading edge defining a leading edge angle $\emptyset$;
  - a trailing edge distal the longitudinal axis, a camber line being defined between the leading edge and trailing edge; and
  - first and second pressure surfaces which extend between the leading edge and the trailing edge;
- wherein the at least one vane defines a chord length l;
- wherein the at least one vane further defines a neck thickness t, proximate the leading edge, in a plane normal to the longitudinal axis; and
- wherein: about 16≤t(l cos $\emptyset$) about 24.

The vane arrangement may form part of a vane insert. Alternatively, the vane arrangement may form part of a compressor cover (being integrally formed therewith).

The vane arrangement may be insertable within, or receivable by, a compressor cover of the compressor.

The vane arrangement may be located between an inlet and an outlet of the compressor. The vane arrangement may be disposed in a generally radially extending channel. The generally radially extending channel may be described as a diffuser passage, or diffuser channel. The generally radially extending channel may be disposed between a compressor wheel (specifically a downstream end thereof) and a generally toroidal volute.

The vane deck may be described as plate-like. The vane deck may form part of a backplate. The backplate may further comprise one or more mounting projections, in the form of one or more mounting rims or flanges and/or sealing projections. The mounting projections and/or sealing projections may extend beyond the vane deck radially and/or axially. That is to say, the vane deck may define an annular portion of the backplate which is partly recessed relative to mounting projections. The vane deck may be said to be bound by one or more mounting projections and/or sealing projections. The vane deck may be said to occupy at least an annular portion of the vane backplate from which the at least one vane extends. Put another way, the vane deck may be defined at least between a leading edge, and a trailing edge, of the at least one vane. The vane deck may define an axially thinnest, or most shallow, portion of the vane arrangement. The deck thickness b may define an axially thinnest, or most shallow, portion of the vane arrangement.

The vane deck may extend entirely around the longitudinal axis (so as to form a closed loop). Alternatively, the vane deck may extend only partway around the longitudinal axis.

The at least one vane may be described as a diffuser vane. The at least one vane may be described as an aerofoil, and may have a NACA profile. The at least one vane may be entirely arcuate. The at least one vane may comprise linear portions. The at least one vane may advantageously influence the fluid flow, which passes across the vane arrangement, to improve the efficiency of a turbomachine, such as a compressor, in which the vane arrangement is incorporated. This may be by way of imparting a swirl to the flow, or facilitating static pressure recovery. The flow velocity may generally be reduced, reducing the overall pressure whilst increasing the static pressure of the flow (otherwise referred to as recovering static pressure from the flow). This advantageously means that less 'work' is required from a volute with respect to recovering static pressure from the flow.

The at least one vane may project collinearly with the longitudinal axis. Alternatively, the at least one vane may extend generally towards longitudinal axis but at a relative angle thereto (e.g. at 30° thereto).

In use, fluid flow may be bound, through a generally radial passage, by the first surface of the vane deck. The first surface of the vane deck may be described as an exposed surface of the vane deck.

The leading edge being proximate the longitudinal axis may otherwise be described as the leading edge being provided towards, or at, a radially inner position on the vane deck.

The leading edge may be a point on an outline of a cross-section of the at least one vane.

The trailing edge being distal the longitudinal axis may otherwise be described as the leading edge being provided towards, or at, a radially outer position on the vane deck. The trailing edge may be a point, or a portion of a line, on an outline of a cross-section of the at least one vane. The trailing edge may have a thickness (e.g. where the trailing edge is an arc, or line).

The first and second pressure surfaces may be referred to as suction and pressure surfaces respectively. The first surface may be described as being generally distal the longitudinal axis and/or compressor impeller. The second surface may be described as generally proximate the longitudinal axis and/or compressor impeller. The first and second pressure surfaces may be referred to as first and second surfaces, or upper and lower surfaces, respectively. The first and/or second surfaces may be entirely arcuate. The first and/or second surfaces may comprise a linear portion.

The neck thickness t refers to a width of the vane (e.g. offset between the first and second pressure surfaces perpendicular to a point on the camber line) at the widest point of a fillet, or rounded or sharpened geometry, which defines the leading edge, proximate the leading edge. Put another way, the neck thickness t refers to a width of the vane, at a point on the camber line, where the first and second pressure surfaces transition from a generally linear to an arcuate geometry in a plane normal to the longitudinal axis (proximate the leading edge). The neck thickness t may be described as a thickness taken at a point, proximate the leading edge, where a leading edge fillet begins. Where the leading edge of the vane, and proximate regions of the first and second pressure surfaces, defines at least part of a generally lozenge-like geometry (e.g. two linear portions connected by an arcuate, or rounded, end), the neck thickness t may be described as a diameter of the rounded end of the lozenge. Where a profile defining the leading edge is elliptical, the neck thickness may be described as a minor diameter of the ellipse.

The camber line refers to a line joining the leading and trailing edges, and which is equidistant from the pressure and suction surfaces. The camber line is therefore indicative of the vane geometry. The camber line extends between the leading and trailing edges of the at least one vane. Where the trailing edge, for example, has a thickness (e.g. it is of the form of an arc, or generally flat surface), the camber line extends to a midpoint of the trailing edge. The midpoint of the trailing edge is defined as a point along a trailing edge 'thickness' which is equidistant from first and second pressure surfaces. It will be appreciated that there is a separate camber line for each respective vane.

The chord length l refers to the straight line distance between the leading and trailing edges. Where either of the leading or trailing edges have a thickness (e.g. they are not a point per se) the chord length extends between midpoints of said leading and trailing edge 'thicknesses'. The chord length l may be described as the linear offset between the leading and trailing edges.

The leading edge angle $\phi$ is an angle defined between a tangent (a camber line tangent) and a radial vector passing through the leading edge, and taken in the plane normal to the longitudinal axis. The camber line tangent is a tangent of the camber line at the leading edge. The camber line tangent extends from the leading edge of the at least one vane in a direction generally away from the longitudinal axis. The radial vector extends through the leading edge, radially outwardly relative to the longitudinal axis. The leading edge angle $\phi$ can otherwise be described as the angle which the camber line makes, at the leading edge, to the radial direction.

The leading edge angle $\phi$ is defined between the camber line tangent, in a direction moving from the leading edge towards the trailing edge of the at least one vane, and the radial vector, moving from a radially inner position to a radially outer position, when viewed facing the first surface of the vane deck. Put another way, the relevant leading edge angle $\phi$ may be provided at a top right, or first, quadrant, where the at least one vane extends in a generally clockwise direction (and where viewed facing the first surface of the vane deck).

The leading edge angle $\phi$ may be described as an angle of inclination of the camber line, in the plane normal to the longitudinal axis, at the leading edge, relative to the radial vector extending through the leading edge.

$t(l \cos \phi)$ may be referred to as a performance, or performance trade-off, term.

The chord length l defines the chord length in millimetres (mm). The leading edge angle $\phi$ defines the angle in degrees. The neck thickness t defines the neck thickness in millimetres (mm).

Advantageously, vane arrangements falling within the range about $16 \leq t(l \cos \phi) \leq$ about 24 have been found to provide a desirably high efficiency when incorporated in a compressor.

Optionally, $16 \leq t(l \cos 519) \leq 24$.

According to a fourth aspect of the invention there is provided a compressor, the compressor comprising:
  a compressor cover;
  a compressor wheel, defining an wheel diameter d, received by the compressor cover; and
  the vane arrangement according to the third aspect of the invention;
  wherein: about $$0.1 \leq \frac{t(l \cos \phi)}{d} \leq \text{about } 0.16.$$

The compressor may be a centrifugal, or radial, compressor. The compressor may have an axial inlet. The compressor may have a generally tangential outlet. The compressor may extend around the longitudinal axis. The compressor wheel does work on a fluid to increase a pressure of the fluid. The fluid may be air. The compressor may be for a turbomachine, such as a turbocharger. The compressor may be a fuel cell compressor.

The compressor cover may be referred to as a compressor housing. The compressor cover generally surrounds the compressor wheel. The compressor cover may engage an adjacent support member to define a wheel cavity. The support member may be a bearing housing or a seal plate. The compressor cover may define a volute. The volute may be generally toroidal. The volute may have a cross-sectional area which increases around the longitudinal axis. The cross-sectional area of the volute may increase linearly around the longitudinal axis. The compressor cover may define an inlet (which may be axial) and a downstream outlet (which may be generally tangential). A generally radial passage may interpose the inlet and the outlet. The radial passage may be described as a diffuser passage. The vane arrangement may be provided proximate, or within, the generally radial passage. The vane arrangement may define, at least in part, the generally radial passage.

The compressor wheel may comprise a plurality of blades. The plurality of blades may be attached to a base of compressor wheel. The compressor wheel may comprise a bore. The bore may be configured to receive a fastener. The fastener may be configured to couple the compressor wheel to a shaft.

The wheel diameter d refers to a diameter at an outermost radial point of the blades of the compressor wheel (at the trailing edge of the compressor wheel). The wheel diameter d is typically lower than an outermost diameter of the entire compressor wheel. The wheel diameter d may be described as an impeller diameter, or an outer blade diameter.

The vane arrangement may be provided downstream of the compressor wheel. The vane arrangement may be provided downstream of a radially outermost tip of the compressor wheel.

$$\frac{t(l \cos \phi)}{d}$$

may be referred to as a performance term, or performance trade-off term, parameterised with respect to wheel diameter.

Compressors having vane arrangements wherein $$\frac{t}{bd} \geq \text{about } 0.0018$$

advantageously provide desirable durability performance (e.g. mechanical fatigue performance) and take into account the wheel diameter of the compressor wheel. Advantageously, the desirable ranges of values can thus be applied to a range of different sizes of compressor (by virtue of incorporating the compressor wheel diameter d term).

The expression may be further refined as:

$$0.1 \leq \frac{t(l \cos \emptyset)}{d} \leq 0.16.$$

The vane arrangement, or compressor, according to any one of the first to fourth aspects of the invention, wherein the at least one vane comprises a plurality of vanes.

Where the at least one vane comprises a plurality of vanes, the fluid passing through the compressor may be more evenly influenced by the vanes. Incorporating a plurality of vanes is also advantageous in providing a more even distribution of mass around the longitudinal axis.

The plurality of vanes may comprise an odd number of vanes. Alternatively, the plurality of vanes may comprise an even number of vanes. The plurality of vanes may consist of between 9 and 17 vanes, for example. The number of vanes incorporated may depend upon a number of factors such as, but not limited to, compressor wheel size and desired compressor performance. Where the one or more vanes comprises a plurality of vanes, each of the plurality of vanes may be substantially identical to one another. That is to say, each of the plurality of vanes may share the same geometry, but be provided at a different position around the longitudinal axis (for example).

The plurality of vanes may be circumferentially distributed about the longitudinal axis.

The vane arrangement, or compressor, cording to any one of the first to fourth aspects of the invention, wherein the vane arrangement forms part of a vane insert.

The vane insert comprises the vane arrangement. The vane insert therefore comprises the vane deck and the at least one vane. The vane insert may comprise a backplate, which the vane deck may form part of. The backplate may further comprise one or more mounting projections, in the form of one or more mounting rims or flanges. The mounting projections may extend beyond the vane deck radially and/or axially. That is to say, the vane deck may define an annular portion of the backplate which is partly recessed relative to mounting projections. The vane deck may be said to be bound by mounting projections. The vane deck may define an axially thinnest, or most shallow, portion of the vane arrangement.

The vane insert may extend entirely around the longitudinal axis (so as to form a closed loop). Alternatively, the vane deck may extend only partway around the longitudinal axis.

The vane insert may be disposed within a generally radially extending passage, or diffuser passage, defined between the compressor and the support member. The vane insert may be receivable in a passage. The vane insert may be configured to engage the compressor and/or support member (which may be a bearing housing, for example). The vane insert may be sandwiched between the support member and the compressor. An axially outer end of the at least one vane, distal the first surface of the vane deck, may be configured to engage the compressor (for example, the compressor cover thereof). A second axially outer end of the vane insert, distal the axially outer end of the at least one vane, may be configured to engage the support member. Specifically, a mounting projection, such as a mounting rim or flange, may be configured to engage the support member.

A rear face of the vane insert (e.g. a face of the vane insert proximate the support member, in use) may be configured to engage a seal. The seal may advantageously reduce flow leakage behind the vane insert (e.g. between the vane insert and the support member). The seal may be an annular seal. The seal may be received in a recess of the support member.

According to another aspect of the invention there is provided a vane insert comprising the vane arrangement in accordance with any preceding aspect of the invention.

According to a fifth aspect of the invention, there is provided a compressor cover for a turbomachine, the compressor cover comprising:

the vane arrangement according to the first or third aspects of the invention, wherein the at least one vane is integrally formed with the compressor cover.

The at least one vane being integrally formed with the compressor cover is intended to mean that the at least one vane and the compressor cover is a monolithic structure. That is to say, each of these components is not connected to one another in a subsequent manufacturing process, but the joins between the components are present from the creation, or inception, of the components. The at least one vane and the compressor cover may be described as being integral with one another. The at least one vane, and the compressor cover, may be described as being a unitary body. More generally, the compressor cover and vane arrangement may be said to be integrally formed with one another. The turbomachine may be, for example, a turbocharger. The turbomachine may be a compressor, such as a fuel cell compressor.

The compressor cover may be manufactured from stainless steel. The compressor cover may be manufactured from stainless steel grade 316. The compressor cover may be manufactured using an additive manufacturing process, such as binder-jetting.

Advantageously, the at least one vane being integrally formed with the compressor cover means that there is no 'free', or exposed, end of the vane adjacent the compressor cover. In prior art arrangements, a free end of the vane can lead to a reduction in compressor efficiency. This is owing to a proportion of the flow passing between the free end of the vane and the adjacent surface. Such losses may be referred to as vane tip losses, or overtip leakage.

The at least one vane being integrally formed with the compressor cover is also beneficial in that the vane does not contribute to a tolerance stack. Such a tolerance stack otherwise risks a gap being present between an exposed end of the vane and an adjacent surface (as described above). A further advantage of having the at least one vane integrally formed with the compressor cover is that no further constraint is required in order to rotationally constrain the vane with respect to the longitudinal axis. Integrally forming the vane with the compressor cover is also advantageous in reducing the risk of corrosion (by alleviating contact between dissimilar materials), reducing the mass of the compressor and providing improved thermomechanical fatigue performance.

Expressed more broadly, the vane arrangement may be said to be integrally formed with the compressor cover.

The compressor according to the second of fourth aspects of the invention, wherein the at least one vane is integrally formed with the compressor cover.

According to a sixth aspect of the invention there is provide a turbocharger comprising:
the compressor according to the second or fourth aspects of the invention;
a turbine comprising a turbine housing and a turbine impeller; and
a support member;
wherein the compressor wheel and turbine wheel are in power communication with one another.

The turbocharger may be a fixed geometry turbocharger. The turbocharger may be a variable geometry turbocharger. The turbocharger may be a wastegated turbocharger.

The turbocharger may form part of an engine arrangement. The engine arrangement may be part of a vehicle, such as an automobile. The engine arrangement may have a static application, such as in a pump arrangement or in a generator.

The turbine wheel may be supported on the same shaft as the compressor wheel. An exhaust gas flow may be used to drive the turbine wheel so as to drive rotation of the compressor wheel.

The compressor may be secured to the turbine via the support member. The support member may be a bearing housing. The support member may be a seal plate. The seal plate may be secured to a bearing housing.

A downstream outlet of the compressor may be in fluid communication with an inlet manifold of cylinders of an engine. The compressor may be used to provide a boost pressure to the engine. An engine comprising the turbocharger may provide improved performance over an engine without a turbocharger, owing to exhaust gas exhausted from the cylinders being used to drive the turbine wheel and so compressor wheel. In other words, otherwise wasted energy in the exhaust flow is used to pressurise air which is used in the combustion cycle.

According to a seventh aspect of the invention there is provided a computer program comprising computer executable instructions that, when executed by a processor, cause the processor to control an additive manufacturing apparatus to manufacture the vane arrangement according to the first or third aspects of the invention.

According to an eighth aspect of the invention there is provided a method of manufacturing a device via additive manufacturing, the method comprising:
obtaining an electronic file representing a geometry of a product wherein the product is a vane arrangement according to the first or third aspects of the invention; and
controlling an additive manufacturing apparatus to manufacture, over one or more additive manufacturing steps, the product according to the geometry specified in the electronic file.

According to a ninth aspect of the invention there is provide a method of manufacturing a vane arrangement according to the first or third aspects of the invention, optionally using an additive manufacture method.

The vane arrangement may be manufactured by casting, or additive manufacture, to name two examples.

According to a tenth aspect of the invention there is provided a method of designing the vane arrangement according to the first aspect of the invention, wherein the method comprises:
adjusting:
the deck thickness b; and/or
the neck thickness t;
such that $$\frac{t}{b} \geq \text{about } 0.21,$$

preferably such that $$\frac{t}{b} \geq \text{about } 0.27.$$

In further refinements:

$$\frac{t}{b} \geq 0.21.$$

In further refinements: about $$0.21 \leq \frac{t}{b} \leq \text{about } 0.38.$$

In refinements:

$$0.21 \leq \frac{t}{b} \leq 0.38.$$

In further refinements:

$$\frac{t}{b} \geq 0.27.$$

In further refinements: about $$0.27 \leq \frac{t}{b} \leq \text{about } 0.37.$$

In refinements:

$$0.27 \leq \frac{t}{b} \leq 0.37.$$

In further refinements:
the deck thickness b; and/or
the neck thickness t; and/or
a wheel diameter d, defined by a compressor wheel;
are adjusted such that:

$$\frac{t}{bd} \geq \text{about } 0.0014,$$

preferably such that:

$$\frac{t}{bd} \geq \text{about } 0.0018.$$

In further refinements:

$$\frac{t}{bd} \geq 0.0014.$$

In further refinements: about $$0.0014 \leq \frac{t}{bd} \leq \text{about } 0.0026.$$

In further refinements:

$$0.0014 \leq \frac{t}{bd} \leq 0.0026.$$

In further refinements:

$$\frac{t}{bd} \geq 0.0018.$$

In further refinements: about $$0.0018 \leq \frac{t}{bd} \leq \text{about } 0.0025.$$

In further refinements:

$$0.0018 \leq \frac{t}{bd} \leq 0.0025.$$

According to an eleventh aspect of the invention there is provided a method of designing the vane arrangement according to the first or third aspect of the invention, wherein the method comprises:
  adjusting:
    the neck thickness t; and/or
    the leading edge angle ∅; and/or
    the chord length l;
  such that about 11≤t(l cos ∅)≤about 25, preferably such that about 16≤t(l cos ∅)≤about 24.
In further refinements: 11≤t(l cos ∅)≤25. In further refinements: 16≤t(l cos ∅)≤24.
  In further refinements:
  the neck thickness t; and/or
  the leading edge angle ∅; and/or
  the chord length l; and/or
  a wheel diameter d, defined by a compressor wheel;
  are adjusted such that: about $$0.069 \leq \frac{t(l \cos \emptyset)}{d} \leq \text{about } 0.17,$$

preferably about $$0.1 \leq \frac{t(l \cos \emptyset)}{d} \leq \text{about } 0.16.$$

In further refinements:

$$0.069 \leq \frac{t(l \cos \emptyset)}{d} \leq 0.17.$$

In further refinements:

$$0.1 \leq \frac{t(l \cos \emptyset)}{d} \leq 0.16.$$

In further refinements, the method further comprises:
  adjusting:
    the thickness b; and/or
    the neck thickness t;
  such that $$\frac{t}{b} \geq \text{about } 0.21,$$

preferably such that $$\frac{t}{b} \geq \text{about } 0.27.$$

In further refinements:

$$\frac{t}{b} \geq 0.21.$$

In further refinements: about $$0.21 \leq \frac{t}{b} \leq \text{about } 0.38.$$

In refinements:

$$0.21 \leq \frac{t}{b} \leq 0.38.$$

In further refinement $$\frac{t}{bd} \geq \text{about } 0.0018.$$

In further refinements:

$$\frac{t}{bd} \geq 0.0018.$$

In further refinements: about $$0.0014 \leq \frac{t}{bd} \leq \text{about } 0.0026.$$

In further refinements:

$$0.0004 \leq \frac{t}{bd} \leq 0.0026.$$

In further refinements:

$$\frac{t}{b} \geq 027.$$

In further refinements: about $$0.27 \leq \frac{t}{b} \leq \text{about } 0.37.$$

In refinements:

$$0.27 \leq \frac{t}{b} \leq 0.37.$$

In further refinements:

$$\frac{t}{bd} \geq \text{about } 0.0018.$$

In further refinements:

$$\frac{t}{bd} \geq 0.0018.$$

In further refinements: about $$0.0018 \leq \frac{t}{bd} \leq \text{about } 0.0025.$$

further refinements:

$$0.0008 \leq \frac{t}{bd} \leq 0.0025.$$

According to a twelfth aspect of the invention there is provided a profile of the at least one vane, of the first aspect of the invention, defined by the plot data or normalised data of Table 1.

The plot data and normalised data each include X and Y values indicative of X and Y coordinates. When plotted, these points indicate the profile (e.g. an outer profile) of a cross-section of the vane. Each vane of a plurality of vanes may share the same profile (although it will be appreciated that the vanes may be offset from one another).

According to a thirteenth aspect of the invention there is provided a vane for a vane arrangement, the vane having a profile defined by the plot data or normalised data of Table 1.

The optional and/or preferred features for each aspect of the invention set out herein are also applicable to any other aspects of the invention.

Specific embodiments of the present invention will now be described, by way of example only, with reference to the accompanying drawings in which:

FIGS. 19 is a table of results, some of which correspond to the points plotted in FIG. 18;

FIGS. 20 and 21 are tables indicating desirable ranges of durability and performance trade-off term (parameterised with respect to wheel diameter in FIG. 21), in accordance with the invention;

FIG. 26 is a table of values indicating parameters defining twelve different vane designs, some of which are according to embodiments of the invention;

FIG. 1 is a schematic illustration of part of a turbocharger 2 in accordance with the invention.

Figure 1:
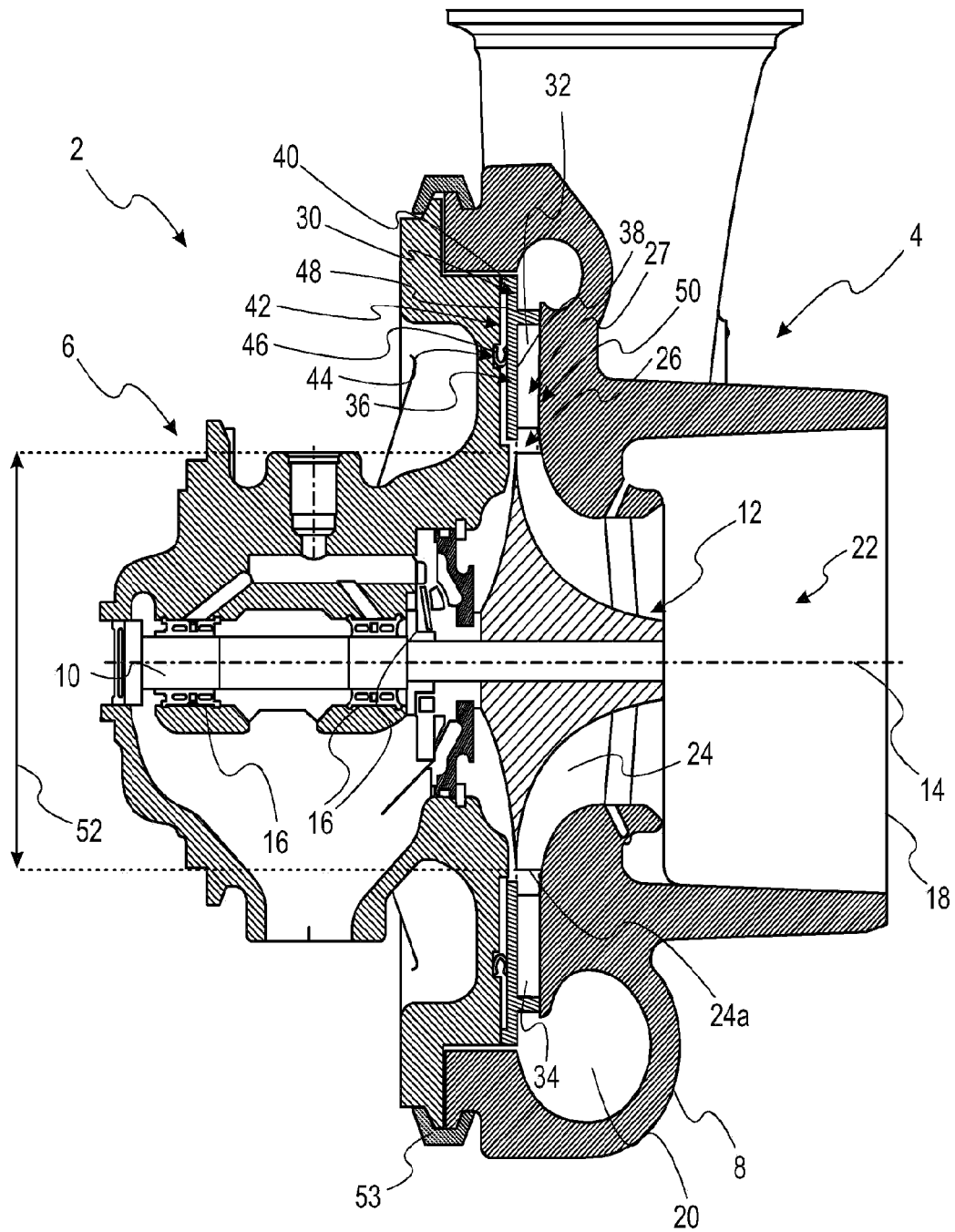
FIG. 1 is a schematic cross-section view of part of a turbocharger in accordance with an embodiment of the invention.

The turbocharger 2 comprises a compressor 4, a bearing housing 6 and a turbine (omitted from FIG. 1). The compressor 4 comprises a compressor cover 8.

The compressor 4 is, in use, connected to the turbine via the bearing housing 6. In the illustrated embodiment, the compressor 4 is directly connected to the bearing housing 6 (which is an example of a support member). However, in other embodiments the compressor may directly connect to a support member in the form of a seal plate (which may otherwise be referred to as a diffuser plate). The seal plate is directly connected to the bearing housing.

Returning to the illustrated embodiment, a shaft 10 extends from the turbine to the compressor 4 through the bearing housing 6. A turbine wheel (not shown in FIG. 1) is mounted on one end of the shaft 10 for rotation within the turbine housing (also not shown in FIG. 1). A compressor wheel 12 is mounted on the other end of the shaft 10 for rotation within the compressor cover 8. The shaft 10 rotates about a longitudinal axis 14. The shaft 10 is supported for rotation by bearing assemblies located in the bearing housing 6, and generally labelled 16.

The turbine housing defines an inlet volute to which gas from an internal combustion engine is delivered. The turbine housing also defines a generally tangential outlet, through which exhaust gas exits the turbine. A turbine wheel interposes the inlet and outlet of the turbine. In use, exhaust gas is expanded across the turbine wheel to drive the turbine wheel and compressor wheel 12 (which are both mounted to the shaft 10).

A wastegate may be used to divert a proportion of the exhaust gas around the turbine wheel (i.e. such that the exhaust gas is not expanded across the turbine wheel). This is one way of controlling the speed of the turbine wheel. Alternatively, a nozzle ring and shroud may define an annular opening upstream of the turbine wheel, and be axially moveable relative to one another to adjust the extent to which the annular opening is open. This is another means of controlling the turbine wheel speed.

The speed of the turbine wheel, and so speed of the compressor wheel 12, is dependent, at least in part, upon the velocity of the gas passing through the annular opening (upstream of the turbine wheel). As mentioned, gas flowing from the turbine inlet to the turbine outlet passes over, and is expanded across, the turbine wheel and, as a result, torque is applied to the shaft 10 to drive the compressor wheel 12. Rotation of the compressor wheel 12 within the compressor cover 8 pressurises ambient air present in an axial inlet 18 and delivers the pressurised air to a downstream outlet (not visible in FIG. 1) via a volute 20. The pressurised air is then fed to an internal combustion engine (not shown). Where the compressor does not form part of a turbocharger it will be appreciated that the pressurised air may not be fed to an internal combustion engine, and may instead be directed to another component. The volute 20 may otherwise be described as a scroll, and is generally toroidal in shape.

Turning to focus on the compressor 4, when fluid, such as air, enters the compressor 4 via the inlet 18, it first passes through an inlet passageway, denoted 22 in FIG. 1. The fluid then reaches the compressor wheel 12, passing over blades 24 (only one of which is numbered) of the compressor wheel 12. Whilst the compressor wheel 12 rotates, work is done on the fluid. The fluid then passes through a passage 26. The passage 26 is an annular passage. The passage 26 extends in a generally radial direction about the longitudinal axis 14. The passage 26 interconnects the inlet passageway 22, and so inlet 18, with the volute 20 (and so downstream outlet).

After passing generally radially along the passage 26, the fluid enters the volute 20. The volute 20 has a cross-sectional area which increases, generally linearly, around the central axis 18, so as to recover static pressure from the flow. The pressurised fluid then the compressor 4 via the downstream outlet (not shown in FIG. 1.

A particular focus of the present application is vane insert 27. In the illustrated embodiment, the vane insert 27 is a separate component to both of the compressor cover 8 and the bearing housing 6. However, in other arrangements, and as will be described in connection with FIG. 24, a vane arrangement may be integrally formed with the compressor cover 8 (instead of forming part of a separate vane insert). Throughout this document, the term 'vane arrangement' is used to refer to at least one vane, extending from a vane deck. The vane arrangement may be incorporated as part of a vane insert, or as part of a compressor cover.

The vane insert 27 is of the form of a generally annular plate, with a plurality of vanes extending therefrom. The vane insert 27 comprises a backplate 30 and a plurality of vanes 32, 34 which project therefrom. Although only two vanes 32, 34 are labelled, and visible in FIG. 1, the plurality of vanes may consist of, for example, between nine and seventeen vanes (see, for example, FIG. 2).

Each of the plurality of vanes 32, 34 extends from the backplate 30. The plurality of vanes 32, 34 are circumferentially distributed about the longitudinal axis 14. The plurality of vanes 32, 34 are equidistantly circumferentially distributed about the longitudinal axis 14. The plurality of vanes 32, 34 specifically project from a vane deck 36, which forms part of the backplate 30. The plurality of vanes 32, 34 project from a first surface 38 of the vane deck 36. The vane deck 36 may, in some arrangements, be narrower than the backplate 30 (e.g. in an axial direction). The vane deck 36 refers to a portion of the backplate 30 from which the vanes 32, 34 extend.

The backplate 30 further comprises a mounting projection in the form of a mounting rim 40. The mounting rim 40 is an annular rim which extends around the longitudinal axis 14. The mounting rim 40 defines a radially outermost point of the vane insert 27. In other arrangements, the vane insert 27 may further comprise a further mounting projection. The further mounting projection may be disposed at a radially innermost point of the backplate 30, or in another position.

In use, the vane insert 27 is sandwiched between the bearing housing 6 and the compressor housing 8. The vane insert 27 may be secured in place, to the bearing housing 6, using one or more fasteners (for example). The mounting rim 40 engages an adjacent surface of the bearing housing 6. Specifically, the mounting rim 40 engages a recess 42 defined in the bearing housing 6. The recess 42 may be sized to accommodate the backplate 30 of the vane insert 27. In the illustrated embodiment, the recess 42 is a first recess, whilst a second recess 44 is also defined in the bearing housing 6. The second recess 44 is configured to receive a seal member 46 therein. In use, the seal member 46 may engage a rear face 48 of the backplate 30, or vane deck 36 more specifically. The seal 46 may advantageously reduce fluid leakage behind the vane insert 27.

The passage 26 may be said to be defined, at least in part, between the first surface 38 of the vane deck 36 and an adjacent wall 50 of the compressor housing 8. The wall 50 of the compressor housing 8 may be described as a radially extending wall. The wall 50 of the compressor housing 8 is provided downstream of the compressor wheel 12. The wall 50 of the compressor housing 8 is therefore radially outward of a radially outermost tip of the compressor wheel 12. For completeness, the line labelled 52 indicates the wheel diameter D of the compressor wheel 12. The wheel diameter D refers to a diameter taken between radially outermost points of the blades 24 on the compressor wheel 12. One such radially outermost point is labelled 24a on the blade 24. As such, for the compressor wheel 12 the wheel diameter D is diametrically inboard of an outermost diameter of the wheel 12.

In the illustrated arrangement the compressor housing 8 is secured to the bearing housing 6 by a band clamp 53. The band clamp 53 extends around the longitudinal axis 14 and urges adjacent flanges of the bearing housing 6 and compressor housing 8 into engagement with one another. In other arrangements, the compressor housing 8 may be secured to the bearing housing 6 by another engagement means, such as by fasteners.

Figure 2:
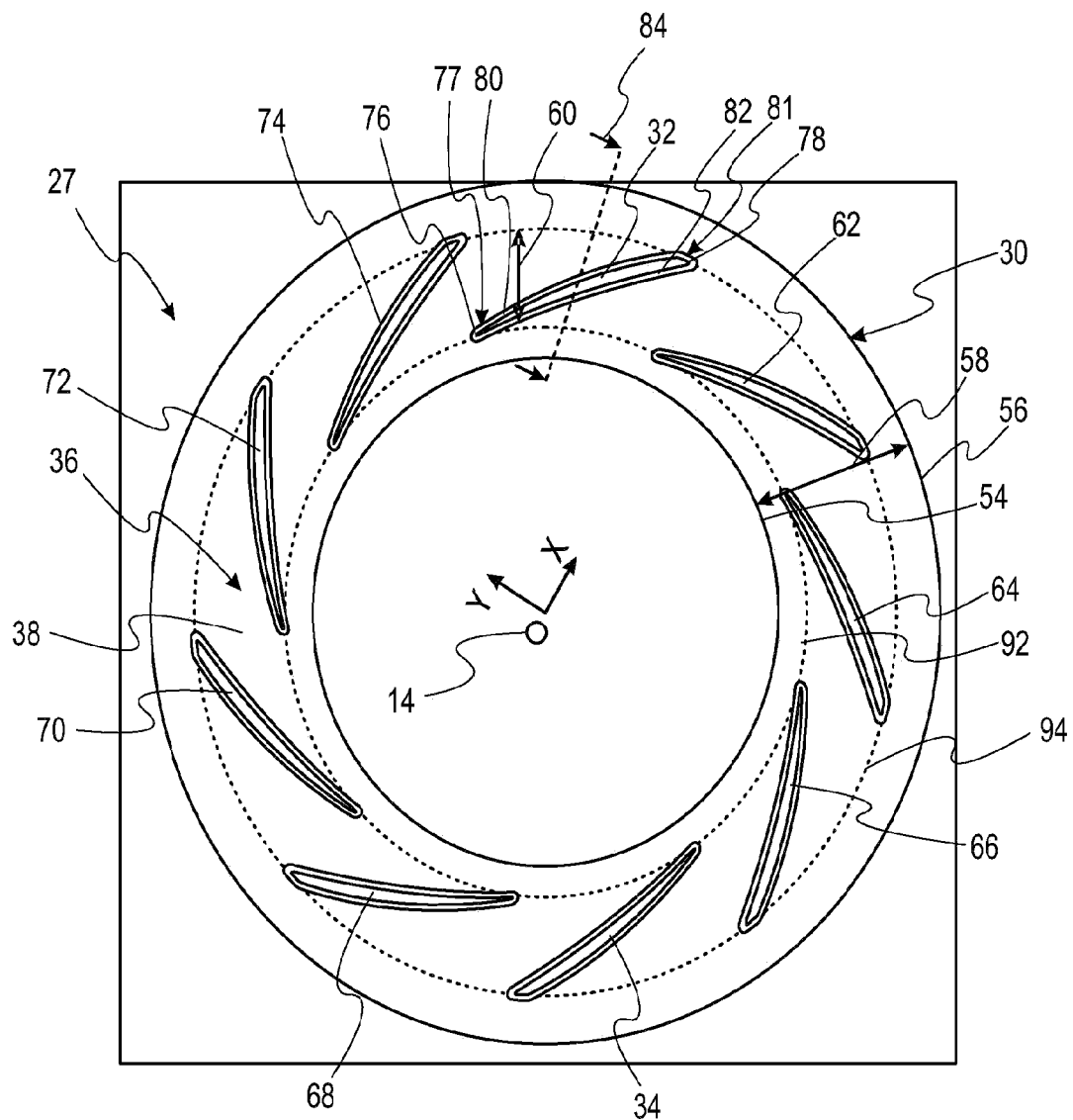
FIG. 2 is an end view of a vane insert, from the turbocharger of FIG. 1, in isolation.

Turning to FIG. 2, the vane insert 27 is provided in isolation. The view shown in FIG. 2 is taken normal to the longitudinal axis 14, and facing the first surface 38 of the vane deck 36. The backplate 30, which the vane deck 36 forms part of, is also shown.

The backplate 30 is defined between a radially inner edge 54 and a radially outer edge 56. A radial extent of the backplate 30 is indicated and labelled 58 in FIG. 2. In contrast, the vane deck 36 refers to a portion of the backplate 30 from which each of a plurality of vanes 32, 34 extend. The radial extent of the backplate 30 that is occupied by the vane deck 36 is labelled 60 in FIG. 2. The vane deck 36 extends between schematically indicated arcs 92, 94. The radially inner arc 92 indicates a radial position at which a leading edge region 77 of the vanes is positioned (or begins). The radially outer arc 94 indicates a radial position at which a trailing edge region 81 of the vanes is positioned (or terminates). Leading/trailing leading edge region 77, 81 is intended to mean a part of the vane 32 which includes leading/trailing edges 76, 78, but which is not necessarily limited to an absolute leading/trailing edge tip. For example, the leading edge region 77 may refer to a first 5%, 10%, or 20% of an extent of the vane 32, proximate the leading edge 76, along a camber line (which will be described in detail below). Similarly, the trailing edge region 81 may refer to a last 5%, 10% or 20% of an extent of the vane 32, proximate the trailing edge 78, along the camber line (in the opposition direction to the direction of the leading edge region). However, in some embodiments, the leading edge 76 and/or trailing edge 78 tip may be positioned at the arcs 92, 94. The arcs 92, 94 are included in FIG. 2 merely to aid explanation, and would not be present in a manufactured vane insert.

As mentioned, vane insert 27 comprises a plurality of vanes 32, 34, 62, 64, 66, 68, 70, 72, 74. In total, the vane insert 27 consists of nine vanes. As labelled only in connection with a first, and uppermost, vane 32 shown in FIG. 2, each of the vanes comprises a leading edge 76, a trailing edge 78, a first pressure surface 80 and a second pressure surface 82. The first and second pressure surfaces 80, 82 in combination with the leading and trailing edges 76, 78 define an external profile of the vane 32.

The leading edge 76 is the edge proximate the longitudinal axis 14. The trailing edge is an edge distal the longitudinal axis 14. The first and second pressure surfaces 80, 82 extend between the leading and trailing edges 76, 78 to define the profile of the vane 32 (specifically a cross-sectional profile of the vane, normal to the longitudinal axis 14). Whilst only described in connection with one of the vanes 32, it will be appreciated that each of the other plurality of vanes also comprise, or define, respective leading and trailing edges and first and second pressure surfaces. The first and second pressure surfaces 80, 82 may otherwise be described as suction and pressure surfaces respectively. As shown in detail in FIG. 7, the leading edge 76 is the upstream point at which a camber line of the vane intersects an outer profile, or surface, of the blade.

Figure 3:
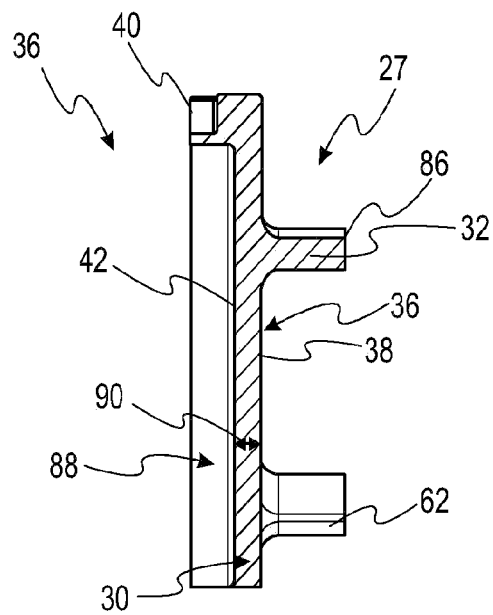
FIG. 3 is a cutaway cross-section view of part of the vane insert of FIG. 2.

Turning to FIG. 3, a cross-section view of part of the vane insert 27, shown in FIG. 2, is provided. The orientation of the cross-section is indicated by the cross-section view lines labelled 84 in FIG. 2.

FIG. 3 shows the backplate 30 comprising the mounting rim 40. The backplate 30 further comprises the vane deck 36, defining the first face 38 from which vanes 32, 62 extend. An axially outer end 86 of the vane 32 is also labelled in FIG. 3.

Owing to the presence of a mounting rim 40, a recess, or cavity, 88 is defined by the backplate 30. A deck thickness b is labelled 90 in FIG. 3, which defines a thickness of the vane deck 36. The deck thickness b may be the minimum axial thickness of the backplate 30. The deck thickness b refers to an axial thickness of the vane deck 36 from which the vanes 32, 62 extend. The deck thickness b is taken to be the thickness between the first surface 38 of the vane deck 36, from which the vanes 32, 62 extend, and an opposing second surface 42 of the vane deck 36. The deck thickness b is typically constant across the vane deck 36, otherwise described as the radial extent 80 of the backplate 30, as indicated in FIG. 2. Described another way, the deck thickness b may be the axial thickness of the backplate 30 excluding any mounting rim 40 or other projecting feature. Of note, increasing the deck thickness increases adds to the thermal inertia of the vane arrangement, which means the vane deck 36, and so the backplate 30, retains heat for longer.

For the vane insert 27, shown in FIG. 3, a single mounting rim 40 extends around a radially outer edge of the backplate 30.

Figure 4:
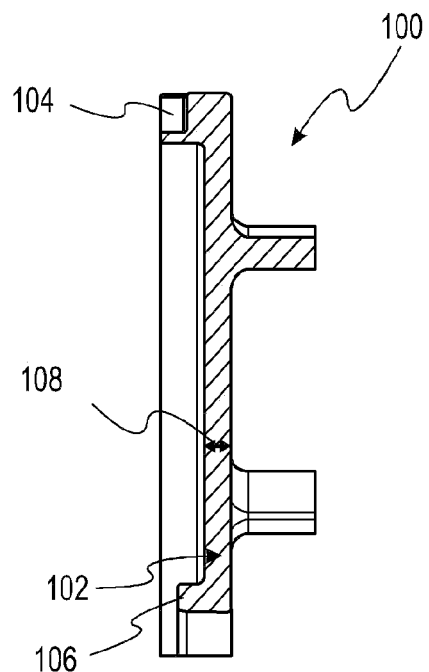
FIG. 4 is a cutaway cross-section view of an alternative vane insert according to an embodiment of the invention.

FIG. 4 is a cross-section view of a vane insert 100 according to another embodiment. Many of the features are shared in common with the vane insert 27 shown in FIG. 3, and only the differences will be described in detail.

The vane insert 100 comprises a backplate 102 which, in turn, comprises a plurality of projections. The plurality of projections take the form of a mounting rim 104 and a seal projection 106. The mounting rim 104 extends around the longitudinal axis about a radially outer edge of the backplate 102. The seal projection 106 extends around the longitudinal axis about a radially inner edge of the backplate 102. The mounting rim 104 projects beyond the seal projection 106. The seal projection 106 reduces air leakage between a diffuser plate (e.g. the bearing housing 6 surface which defines the passage 26 in FIG. 1) and the vaned insert 100. A deck thickness b is indicated by numeral 108.

Figure 5:
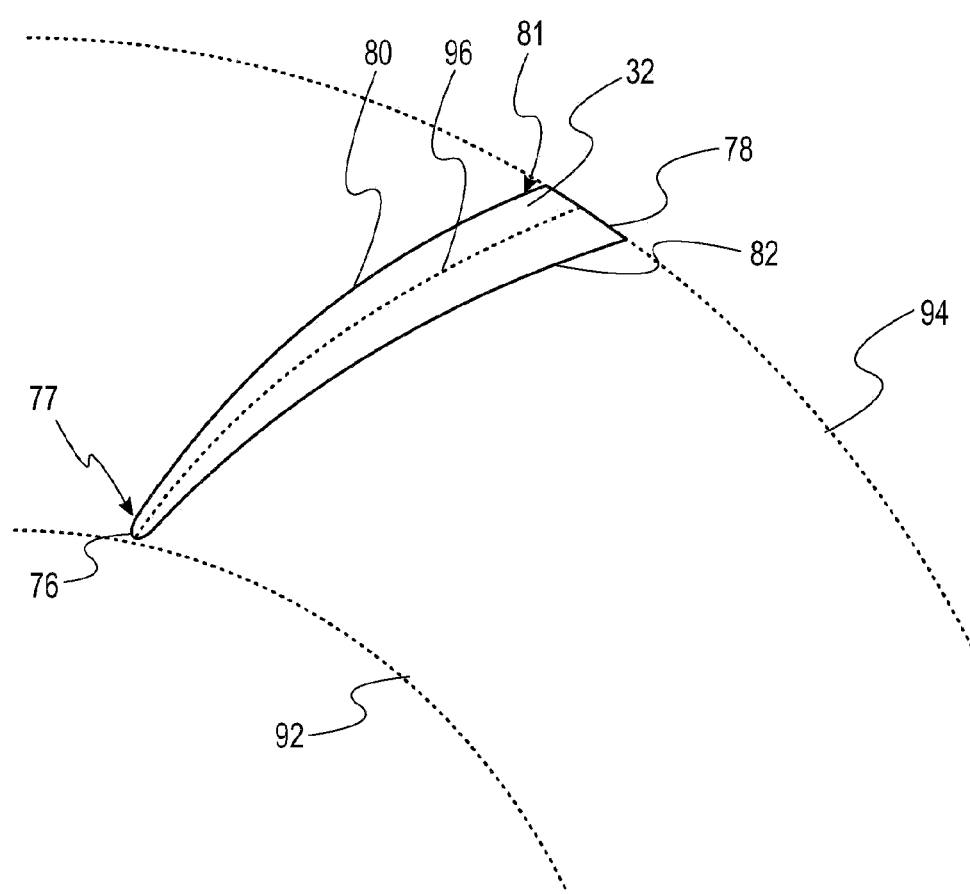
FIG. 5 is a schematic illustration of part of the vane insert of FIG. 2.

Turning to FIG. 5, a schematic outline view of the vane 32 is provided.

Geometric features of the vane 32 already described and illustrated in connection with FIG. 3 are also indicated in FIG. 5: the leading edge 76, first pressure surface 80, second pressure surface 82, trailing edge 78, leading edge region 77 and trailing edge region 81 are all labelled. Of note, the trailing edge 78 is not a point as such, in FIG. 5, but is an arc which extends at a constant radius relative to the longitudinal axis (which is not shown in FIG. 5). The trailing edge 78 may be described as a region where the flow 'exits' the vane 32 (and so other vanes, which lie in the same plane).

The trailing edge 78 may be described as a radially outermost point of the vane 32 (relative to the longitudinal axis). The trailing edge 78 may be described as including the radially outermost point of the vane 32. Where said radially outermost point of the vane lies on a (constant radius) arc, the entire arc may be considered to be the trailing edge. Where said radially outermost point lies on a generally flat surface, the generally flat surface may be considered to be the trailing edge. In other arrangements, the trailing edge may be a point similar to that of the leading edge 76.

Two arcs 92 and 94 are schematically indicated in FIG. 5. The radially inner arc 92 indicates a radial position at which the leading edge region 77 is positioned. The radially outer arc 94 indicates a radial position at which the trailing edge region 81 is provided. Both radii are relative to the longitudinal axis. The radius between the arcs 92, 94 also indicates the extent of the vane deck from which the vane 32 extends. In the illustrated embodiment, the trailing edge 78 is also positioned at the outer arc 94.

Also schematically indicated in FIG. 5 is a camber line 96 defined between the leading and trailing edges 76, 78. For the purposes of this document, the camber line takes on its usual meaning in that it refers to a line which is equidistant from the first and second pressure surfaces 80, 82. The camber line 96 may be said to join the leading and trailing edges 76, 78. The camber line 96 is therefore indicative of the vane 32 geometry. More details regarding ways of parameterising the vane 32 design will be provided in connection with FIG. 6, which is an annotated version of FIG. 5.

Figure 6:
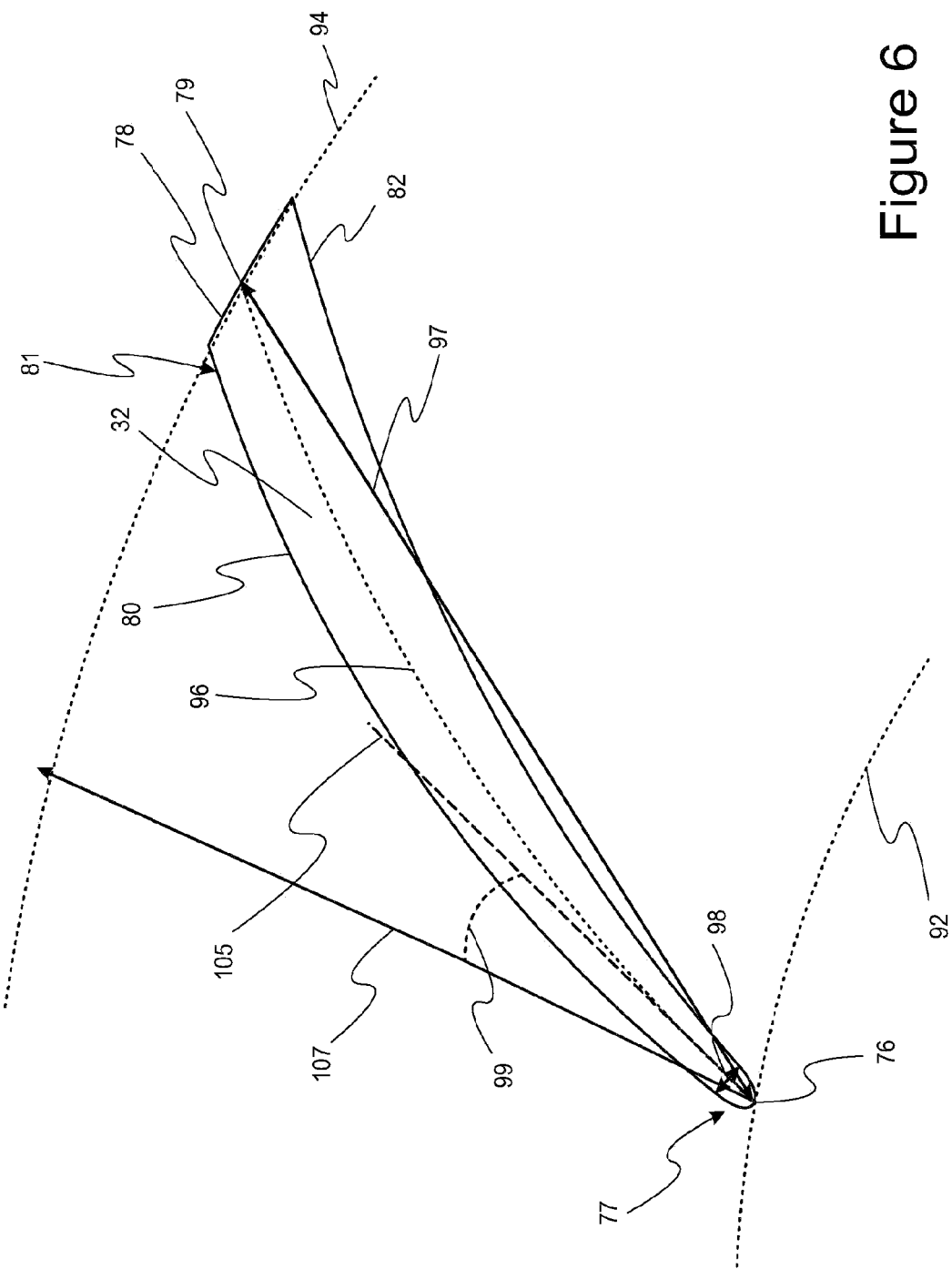
FIG. 6 is an annotated version of the schematic illustration shown in FIG. 5.

Turning to FIG. 6, an annotated version of FIG. 5 is provided. The features already indicated in FIG. 5 are also shown in FIG. 6 for completeness (e.g. the leading edge 76 and trailing edge 78). However, some further variables, which can be used to parameterise the vane 32, are also labelled in FIG. 6. FIG. 6 shows a profile (e.g. an outer profile, or perimeter) of the vane 32 in a plane normal to the axial direction (in which the vane 32 projects).

Firstly, a chord length l is labelled 97. The chord length l is the straight-line distance between the leading edge 76 and trailing edge 78, or end points of the camber line 96.

As mentioned above, the camber line 96 refers to a line which is equidistant from the first and second pressure surfaces 80, 82. For the vane 32 illustrated in FIG. 6, where the trailing edge 78 is an arc, the camber line 96 extends between the leading edge 76 and a midpoint 79 of the trailing edge 78. The midpoint 79 of the trailing edge 78 is taken to be a point, along the trailing edge 'arc' 78, which is equidistant from both the first and second pressure surfaces 80, 82. The arc 78 may be referred to as a trailing edge thickness. The chord length l may be described as extending to a point on the camber line 96 where the camber line 96 intersects the trailing edge thickness 78. In arrangements where the trailing edge is a point, the chord length l is simply the straight-line distance between the leading edge 76 and the trailing edge.

Also indicated is a neck thickness t that is labelled 98 in FIG. 6. The neck thickness t is indicative of a thickness of the vane (e.g. a distance between the first and second pressure surfaces 80, 82) at a point on the camber line 96 where the vane tapers, or sharpens, to define the leading edge 76. Where the vane generally decreases in thickness moving from the trailing edge 78 to the leading edge 76, as shown in FIG. 6, the neck thickness t is taken, at a point along the camber line 96, where a more significant taper begins (the more significant taper terminating at the leading edge 76). Where the profile defining the leading edge 76 is elliptical, the neck thickness t may be described as a minor diameter of the ellipse. The neck thickness t may otherwise be described as a leading edge thickness. Neck thickness t may be described as a thickness of the vane at a point which is, for example, 2%, 3% or 4%, for example, along a length of the camber line from the leading edge 76. More detail regarding the neck thickness t will be provided below in connection with FIG. 7.

A leading edge angle $\theta$ is also defined by the leading edge 76, and is labelled 99 in FIG. 6. The leading edge angle $\theta$ is defined as an angle between a tangent 105 and a radial vector 107 which passes through the leading edge 76. The tangent 105 is taken along the camber line 96 at the leading edge 76. The tangent 105 may be referred to as a camber line tangent. The radial vector 107 is a radially extending vector, about the longitudinal axis 14, which intersects, or passes through, the leading edge 76. The leading edge angle $\theta$ may be described as the angle made by the tangent 105, at the leading edge 76, in the radial direction. The leading edge angle $\theta$, or 99, is indicative of the angle at which the camber line 96 extends (at the leading edge 76) relative to a radius to the longitudinal axis (not shown in FIG. 6).

Figure 7:
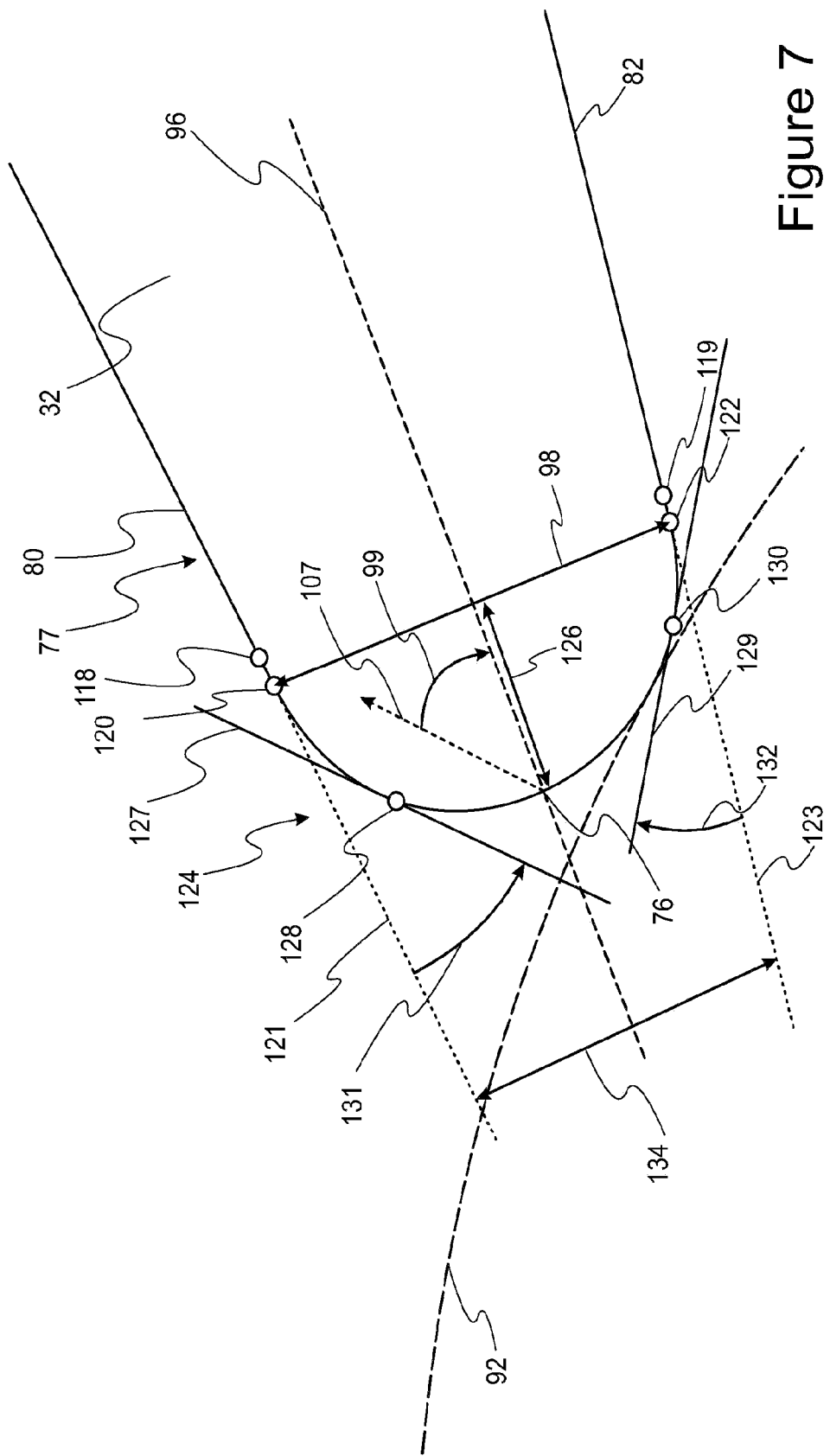
FIG. 7 is a magnified schematic view of a leading edge region of the vane shown in FIGS. 5 and 6.

Turning to FIG. 7, a magnified view of the leading edge region 77 of the vane 32 is provided. The inner arc 92 is also shown for ease of reference.

Firstly, FIG. 7 shows, in more detail, how the leading edge 76 is defined at a point along the camber line 96 where the camber line 96 passes through an outer profile of the vane 32, at an upstream end, proximate the longitudinal axis (not shown in FIG. 7). Radial vector 107 is also shown in FIG. 7, passing through the leading edge 76, and leading edge angle $\theta$ is labelled 99.

More detail regarding the definition of the neck thickness t, labelled 98, will now be provided.

As mentioned previously, the neck thickness t is the distance between the first and second pressure surfaces 80, 82 (perpendicular to the camber line 96) at a point on the camber line 96 where the vane tapers, or sharpens, to define the leading edge 76. Where the vane generally decreases in thickness moving from the trailing edge 78 to the leading edge 76, as shown in FIG. 6, the neck thickness t is taken, at a point along the camber line 96, where a more significant taper begins (the more significant taper terminating at the leading edge 76).

Returning to FIG. 7, the neck thickness t is the thickness of the vane 32, between points 120, 122 (perpendicular to the camber line 96), along the first and second pressure surfaces 80, 82 respectively, where a leading edge taper zone 124 begins. An extent of the leading edge taper zone 124, along the camber line 96, is labelled 126 in FIG. 7. The leading edge taper zone 124 is a zone in which a tip treatment is applied, to the vane 32 (specifically to first and second pressure surfaces 80, 82 thereof), to define the leading edge 76. The tip treatment may be, for example, a 'rounding off' of the vane, which may be to improve aerodynamic performance. The tip treatment geometry may be circular, or elliptical, for example. Alternatively, the tip treatment geometry may be a combination of circular and elliptical, or may be another arbitrary geometry.

The neck thickness t is a minimum thickness of the vane, proximate the leading edge 76, downstream of the leading edge taper zone 124.

The position of a start of the leading edge taper zone 124, and so location of points 120, 122 on the first and second pressure surfaces 80, 82 respectively, can be identified as follows. The point 120 is the first point along the first pressure surface 80 where, moving generally radially inwardly along the camber line 96, and proximate the leading edge 76, an acute angle 131 between a tangent 121 to the point 120, and a tangent 127 to a successive point 128 along the first pressure surface 80, begins to increase. Similarly, the point 122 is the first point along the second pressure surface 82 where, moving generally radially inwardly along the camber line 96, an acute angle 132 between a tangent 123 to the point 122, and a tangent 129 to a successive point 130 along the second pressure surface 82, begins to increase. This indicates the first and second pressure surfaces 80, 82 beginning to converge, or the rate of convergence increasing (depending upon the vane geometry), proximate the leading edge 76 to define the leading edge 76.

The leading edge taper zone 124 can also be described as beginning radially inwards of a point where, moving from the leading edge 76 generally radially outwardly along the camber line 96, the angle between tangents to successive points 120, 118 along the first pressure surface 80 reduces to substantially zero (e.g. the successive tangents become substantially parallel). This is indicative of the first pressure surface 80 beginning to follow a linear geometry (or having 'stabilised'), indicating the leading edge taper zone 124, or tip treatment, to have finished. This explanation is also equally applicable to the second pressure surface 82, and successive points 122, 119. It will be appreciated that the leading edge 76 is positioned radially inwardly of the position 98 at which the neck thickness t is taken. Said position 98 also defines the maximum thickness of the vane 32 in the leading edge taper zone 124.

Had the tip treatment not been applied, the minimum vane thickness may be defined, depending upon the shape of the first and second pressure surfaces 80, 82 respectively, by the line labelled 134 in FIG. 7. The line 134 indicates a thickness where projections of the first and second pressure surfaces 80, 82 intersect the arc 92.

It will be appreciated that, in other embodiments, the first and second pressure surfaces 80, 82 may be, for example, generally parallel to one another.

The inventors have devised a method, and associated variable range, of providing a desirable vane design by modifying the aforementioned parameters (among others). The inventors have used the parameters to define a durability term, indicative of a robustness of the vane, and a performance trade-off term, indicative of an aerodynamic performance of the vane. The durability term and performance trade-off term, and a corresponding parameter key, are set out below:

$$\text{Durability term} = \pi_1 = \frac{t}{b}$$

$$\text{Performance trade-off term} = \pi_2 = t(l \cos \emptyset)$$

t=neck thickness (mm)
b=deck thickness (mm)
l=chord length (mm)
$\emptyset$=leading edge angle (deg)

The inventors have identified high performing ranges of durability term and performance trade-off term that balance the durability of the vane with the performance of the vane. Before discussing the specific ranges that have been identified, the methodology for arriving at the durability and performance trade-off terms will be described.

Previous methods used to design vanes have failed to consider, or establish, a direct link between durability and performance. Furthermore, an iterative process has previously been required in order to develop vane geometries. After complex, lengthy and costly iterations, a preferred vane geometry has previously been selected on the basis of what design meets the requirements specific to an associated brief. By deriving the $\pi_1$ and $\pi_2$ terms, and by identifying ranges of desirable values of the same, the inventors have streamlined the vane design process and can thus avoid the need for iterative design processes in the future. By being representative of durability and performance, assessing the $\pi_1$ and $\pi_2$ terms associated with a vane design, and confirming they fall within the desirable ranges identified by the inventors, provides a reliable indication of the durability and performance of the vane design without requiring further analysis and/or iterative design. The design process is thus made less complex and costly, and brevity is improved.

Figure 8:
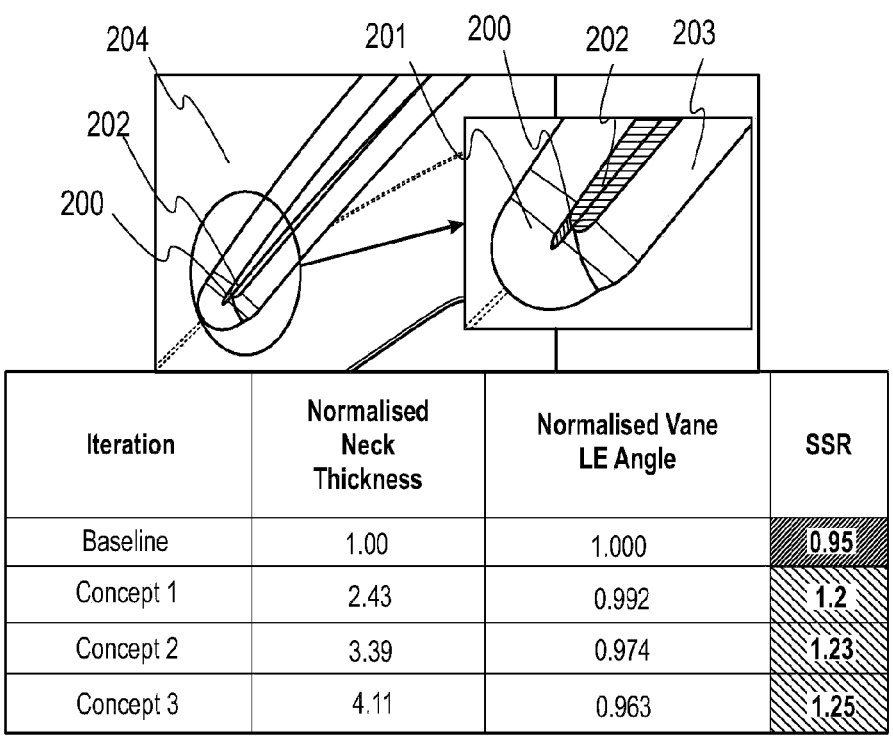
FIG. 8 is a cutaway cross-section view of a part of a baseline vane arrangement, and a vane arrangement improved in accordance with the invention, along with a table of results.
Figure 9:
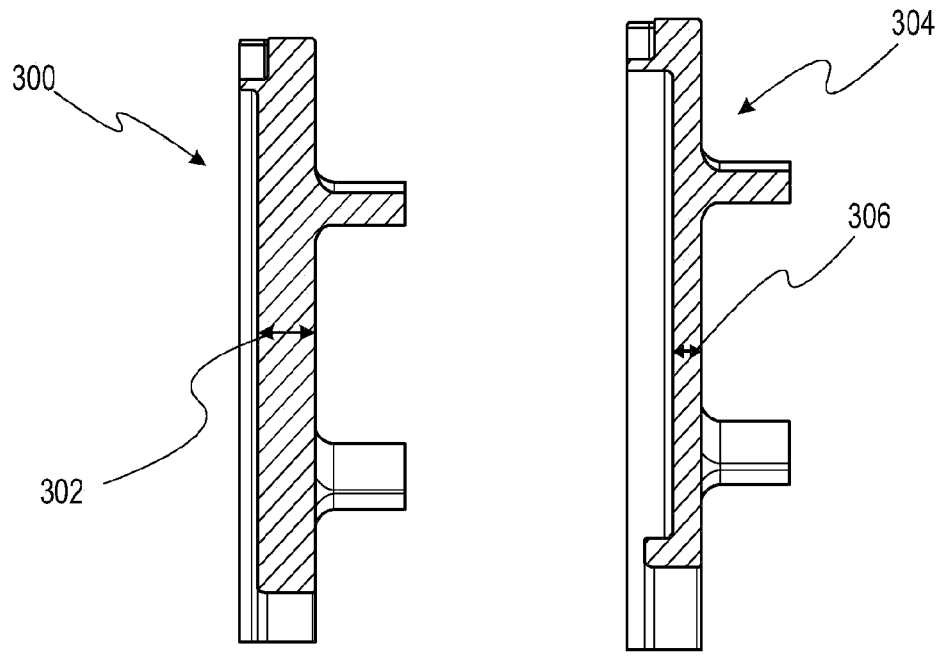
FIG. 9 is a cutaway cross-section view of part of a baseline vane insert, along with a vane insert improved in accordance with the invention, along with a table of results.

Beginning with the durability term, which is equal to the neck thickness divided by deck thickness, FIGS. 8 and 9 include tables indicating simulation results that lead the inventors to derive the durability term. FIGS. 8 and 9 also include indications of a baseline design, and a corresponding improved design in accordance with the invention.

An upper part of FIG. 8 shows part of a vane arrangement. A baseline vane profile is labelled 200, and an improved vane profile is labelled 202. The profiles are partly overlaid with one another, and are both shown extending from a first surface 204 of a respective vane deck. An arcuate surface, in the form of fillets 201, 203, is shown extending from the respective profiles 200, 202 and merging with the first surface 204.

The upper part of FIG. 8 indicates that the improved profile 202 is relatively thicker than the baseline profile 200. Turning to the table provided in FIG. 8, the inventors conducted thermomechanical fatigue simulations on a variety of different vane designs/iterations and, as indicated by the table of results, concluded that the thermal durability of the vane is positively correlated with the (normalised) neck thickness t. The normalisation is relative to a baseline vane design. The table indicates that a higher value of neck thickness t results in a higher value of SSR. For reasons which will be explained below, the inventors therefore concluded that the durability of a vane is positively correlated to the neck thickness t of the vane.

The strength to strain ratio (SSR) is indicative of the durability of a vane, for example the thermomechanical fatigue performance of the vane. An SSR of less than 1 indicates that a mechanical failure, due to fatigue, may occur. It is therefore desirable that the SSR be at least 1, and preferably be as high as possible. Of note, the failure of a vane can be catastrophic for an engine. For example, the vane, or a part thereof, may become separated from the vane deck and be blown through the compressor, risking becoming trapped in the downstream engine system. This negatively impacts performance and can be a significant warranty issue for turbocharger suppliers. The durability of a vane may be affected by cyclic thermal loading of the vane, by virtue of cyclical turbocharger operation and the associated temperature fluctuation. Temperature fluctuation may be caused by heat transferred, by conduction, from the bearing housing and/or convection due to the air compressed by the compressor wheel passing over the vane. The durability of a vane may also be affected by the static loading of the vane, where a vane insert is sandwiched between a compressor cover and bearing housing. It is desirable to have an SSR that is as high as possible, the SSR being indicative of improved thermomechanical performance, and so durability, of the vane.

Turning to FIG. 9, a table of results is provided along with a cross-section view of a vane insert (the right-hand image being that shown in FIG. 4). A baseline design of vane insert 300, having a deck thickness 302, is shown on the left-hand side. An improved vane insert 304, having a deck thickness 306, is shown on the right-hand side.

The table of results indicates that the durability of the vanes (as indicated by the SSR value) is negatively correlated with the (normalised) vane deck thickness b. This is at least by virtue of the fact that the SSR value increases (e.g. thermomechanical fatigue performance improves) as the deck thickness b is reduced.

Figure 10:
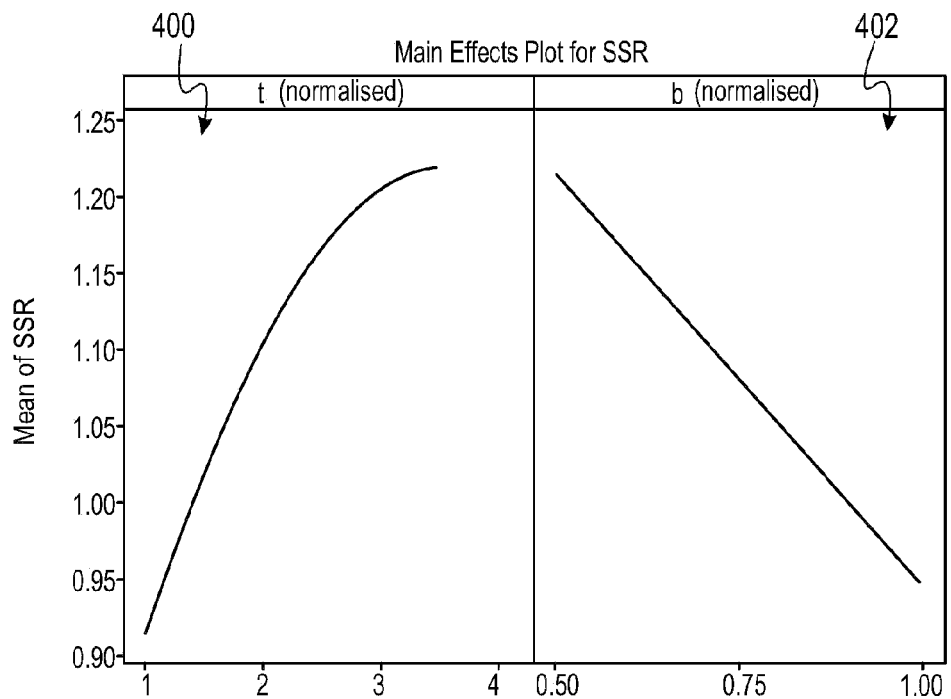
FIG. 10 shows two graphs indicating the effect of neck thickness, and deck thickness, on SSR value in accordance with the invention.

Turning to FIG. 10, two graphs 400, 402 are provided in support of the durability term t/b derived by the inventors. The data points on graphs 400, 402 correspond to the results provided in the tables of FIGS. 8 and 9.

On the Y-axis of both graphs 400, 402, a mean of SSR value is provided. This is the mean value of the strength to strain ratios for a given vane design having a (normalised) parameter as indicated on the X-axis. The normalisation is relative to a baseline vane design.

On the first graph 400, a (normalised) neck thickness t is indicated on the X-axis. On the second graph 402, a (normalised) deck thickness b is indicated.

Computer simulations indicate that the SSR value is positively correlated with neck thickness t. That is to say, a greater neck thickness t is indicative of a higher SSR value (and so a more durable vane). Computer simulations also indicate that the SSR value is negatively correlated with deck thickness b. That is to say, a lower deck thickness b is indicative of a higher SSR value.

The greatest SSR value (indicative of a most durable vane) can therefore be achieved by a combination of:
A high value of neck thickness t; and
A low value of deck thickness b.

In view of the above, the durability term is derived:

$$\text{Durability term} = \pi_1 = \frac{t}{b}$$

Figure 11:
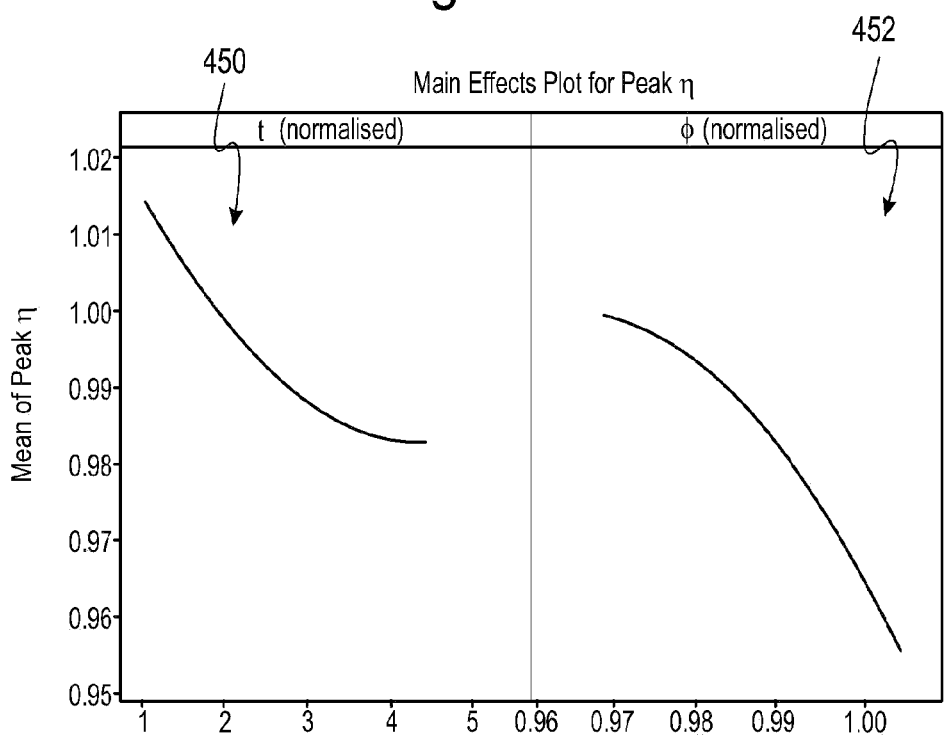
FIG. 11 shows two graphs indicating the effect of neck thickness, and leading edge angle, on the mean of peak efficiency value in accordance with the invention.

Turning to FIG. 11, two graphs 450, 452 are provided in support of the performance trade-off term derived by the inventors.

On the Y-axis of both graphs 450 and 452, a (normalised) mean of peak efficiency value is provided. This is the (normalised) mean value of a range of peak efficiencies for a compressor incorporating the vane arrangement according to the parameters on the X-axis. The different values (of mean of peak efficiency) are obtained by varying the neck thickness t and/or leading edge angle $\theta$.

It is also desirable that the peak efficiency of the compressor, incorporating the vane, be as high as possible. The peak efficiency value indicates the (peak) amount of useful work that the compressor wheel does on the fluid flow as a proportion of the power provided to the compressor wheel by the turbine. The peak efficiency may be defined as a maximum isentropic efficiency for a given design speed. The isentropic compressor efficiency may be defined as a ratio of an isentropic temperature rise to an actual temperature rise. It will be appreciated that an isentropic temperature rise refers to a compression process in which there is no entropy change (e.g. the process is entirely reversible and adiabatic).

On the X-axis of the first graph 450, a (normalised) neck thickness t is provided. On the X-axis of the second graph 452, a (normalised) leading edge angle $\theta$ is provided. It will also be recalled that l is the chord length (mm) and $\theta$ is the leading edge angle (deg).

Computer simulations run by the inventors, which have produced the results indicated in FIG. 11, indicate that the compressor stage efficiency is dependent upon neck thickness t, and leading edge angle $\theta$.

As indicated in the graphs 450, 452 of FIG. 11, the mean of peak efficiency is negatively correlated to neck thickness t, and is negatively correlated to leading edge angle $\theta$.

The greatest mean of peak efficiency value (indicative of a highest [aerodynamically] performing vane) can therefore be achieved by a combination of:
A low value of neck thickness t; and
A low value of leading edge angle $\theta$.

These terms thus form the basis of the performance trade-off term:

Performance trade–off term=$\pi_2$=t(l cos $\theta$)

The leading edge angle $\theta$ is used in the performance trade-off term because the mean of peak efficiency value is negatively correlated to the leading edge angle $\theta$. To increase peak efficiency, the leading edge angle $\theta$ should be reduced. The cosine of the leading edge angle $\theta$ is preferred because the cosine term is unitless. It therefore follows that the mean of peak efficiency value is positively correlated to the cosine of the leading edge angle $\theta$. To increase peak efficiency, the cosine of the leading edge angle $\theta$ should be increased.

The chord length l is multiplied in the performance trade-off term so as to cover a range of vane shapes. This is also because it is known that the whole vane shape affects the peak efficiency value (and the cos $\theta$ term described above is not indicative of the entire vane shape in isolation). The range of vane shapes may be dependent upon a flow rate which is required for the particular vane. The term l cos $\theta$ is thus derived as an empirical term which captures the effect of vane geometry or the purposes of performance analysis.

The term l cos $\theta$ is an imprint of the length of the vane as seen along a radial direction. The term l cos $\theta$ captures the effect of the leading edge angle band vane shape in a single term.

Through computer simulations and testing, the inventors have identified that there exists a particular range of vane parameters in which the vane SSR and efficiency levels are desirably high. The inventors have therefore identified a particularly desirable range of parameters which provide a desirable level of both durability (by way of the SSR) and performance (by way of the peak efficiency). In particular, there exists a range of values in which a high SSR can be obtained but not at the expense of significantly reducing the peak efficiency of the compressor. Knowledge of these parameters, and the relevant ranges, advantageously facilitates efficient vane design Turning to FIG. 12, a further plot 500, and accompanying key, is provided. The data points provided on the plot have been obtained from simulation data.

On the X-axis, a normalised neck thickness t value is provided. On the Y-axis, a normalised leading edge angle $\theta$ is provided. Also shown are bands of normalised SSR value (indicated as vertical lines). A band indicating an SSR value of 1.00 is labelled 502, and a band indicating an SSR value of 1.10 is labelled 504 (as indicated by the key adjacent the plot). Arrow 506 indicates a direction of increasing SSR value (and so improved durability of the vane).

Bands of (normalised) peak efficiency are also indicated. Unlike the SSR bands, the peak efficiency bands are non-linear. A band indicating a normalised peak efficiency of 1.01 is labelled 508, and a band indicating a normalised peak efficiency of 1.00 is labelled 510. Arrow 512 indicates a direction of increasing peak efficiency value (and so improved aerodynamic performance of the vane).

It will be recalled that existing vanes may suffer from an undesirably short lifespan due to failure, for example by thermomechanical fatigue, because of their thin 'leading edge' (which reduces their strength). It is therefore desirable to improve the durability of vanes, without negatively affecting the aerodynamic performance (which generally reduces as the thickness is increased).

The inventors therefore sought to improve the SSR value of vanes (indicative of the durability of the vanes), whilst retaining a peak efficiency which is at least comparable, preferably at least the same, as a baseline design.

Figure 12:
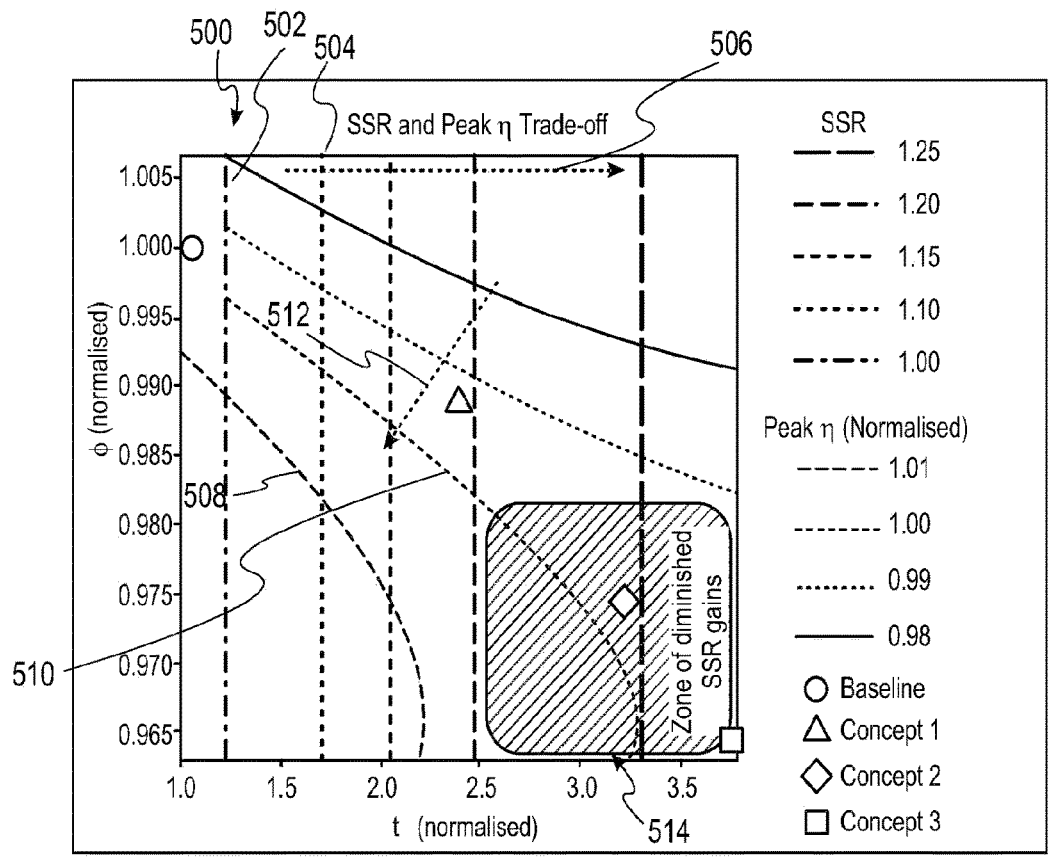
FIG. 12 is a contour plot indicating the effect of neck thickness, and leading edge angle, upon SSR value and peak efficiency value in accordance with the invention.

The data from FIG. 12 is based upon a particular deck thickness b. That is to say, the deck thickness b is not varied for the simulations which results are included in FIG. 11. The deck thickness b does not affect aerodynamic performance (e.g. it does not feature in the performance trade-off term $\pi_2$). A low value of deck thickness b may be selected based upon a lowest value possible due to manufacturing requirements.

FIG. 12, specifically plot 500, indicates:

As neck thickness t is increased, SSR increases; and

Peak efficiency increases as both leading edge angle ∅ and neck thickness t are reduced.

However, in relation to the second bullet point above, as high a value of neck thickness t as possible is desirable to improve the SSR (and so provide a more durable vane).

There is thus a particular band of leading edge angle ∅ and neck thickness t whereby an improvement in SSR can be obtained without a significant reduction in peak efficiency. Said zone is shown cross-hatched, and labelled 514, in FIG. 12. The 'desirable zone' 514 indicates parameter ranges having an improved SSR value, but an efficiency which is within ±3% of the baseline efficiency.

Of note, data points falling outside of the range: 1.0≤ (normalised) SSR 1.25 and 0.98 ≤(normalised) peak efficiency ≤1.01 are less certain as the results in FIG. 12 are based upon data from a limited number of simulations. Also of note, many simulations, relating to different concepts, were run, but only four are indicated in FIG. 12.

The inventors therefore sought to optimise the various parameters in the durability and performance trade-off terms, in the form of a range of advantageous durability and performance trade-off terms, to specify a range of vanes which are both durable and high performing.

Figure 13:
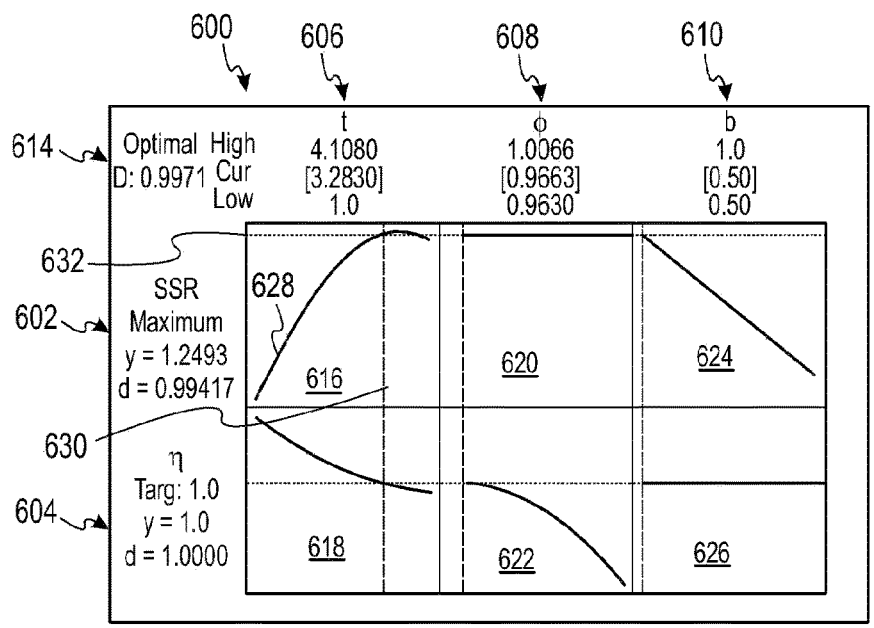
FIG. 13 is a screenshot of optimisation software based upon the model described herein in accordance with the invention.

FIG. 13 is a screenshot 600 taken from optimisation software, using an inputted data model, which optimises (normalised) SSR value 602 and (normalised) efficiency η 604 terms by adjusting (normalised) neck thickness t 606, (normalised) leading edge angle ∅ 608 and (normalised) deck thickness b 610. The optimisation is in view of the goals/targets 612.

It can be observed that in the FIG. 13 arrangement, the goal set is to maximise SSR whilst retaining a normalised peak efficiency value of 1 (i.e. at least equal to a baseline design aerodynamic performance).

A 'desirability' value D 614 is shown in FIG. 13, which indicates how closely the specific set of parameters 606, 608, 610 meet the specified goal/target 612. A value of 1.00 indicates the closest-to-target solution.

FIG. 13 shows six separate plots 616, 618, 620, 622, 624, 626 which indicate the relationship between the relevant parameter 606, 608, 610 and SSR value 602/peak efficiency 604. For each plot, the vertical line indicates the current value of the parameter, whilst the other solid line indicates the correlation with the SSR value 602/peak efficiency 604. For example, taking the first plot 616, the vertical line 630 indicates the current value of (normalised) neck thickness t (3.2830, per the bracketed term underneath the label 606). The arc 628 indicates that the SSR value 602 is positively correlated with the neck thickness t, and the dashed line 623 indicates the SSR value 602 for this design (1.2493, per the term adjacent the 602 label).

The sixth plot 626 indicates, for example, that the peak efficiency 604 is not correlated with the deck thickness b 610.

Figure 14:
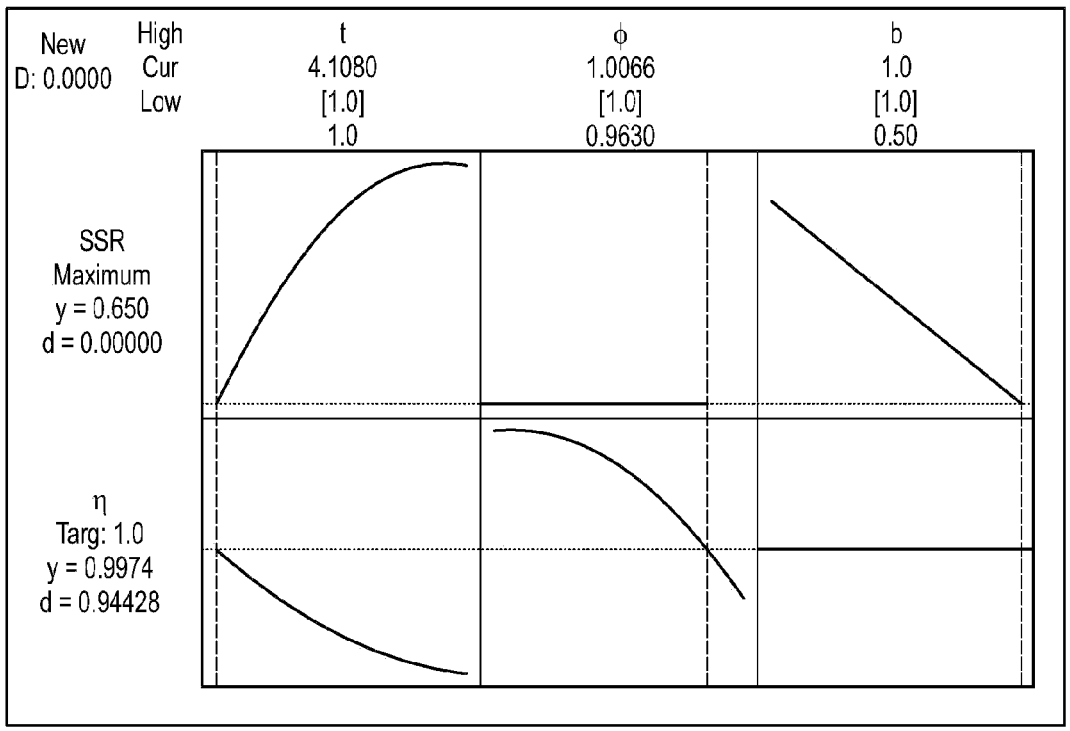
FIGS. 14-17 are screenshots of the optimisation model for three different vane design concepts, in accordance with the invention.

FIG. 14 shows the results of a baseline design in the optimisation model described in connection with FIG. 13. The desirability value 'D' is zero, indicating the baseline design to be the least desirable design in view of the goal/target 612 of FIG. 13 (i.e. normalised peak efficiency=1, and SSR at a maximum value).

Figure 15:
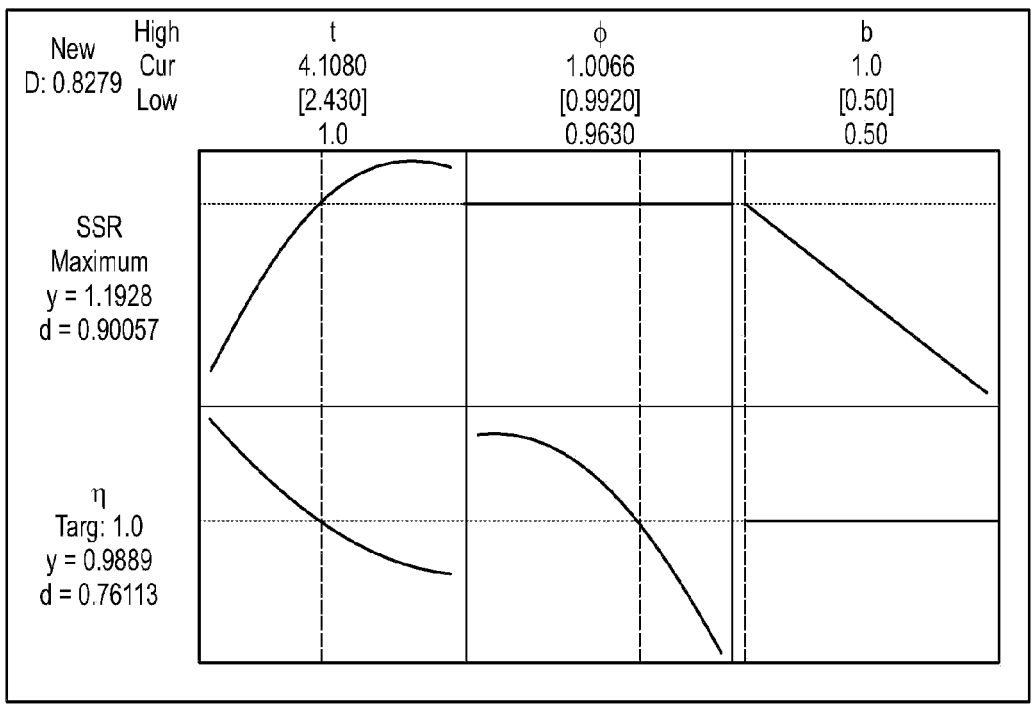

FIG. 15 shows the results of a first concept in the optimisation model. Desirability 'D'≈0.83, the design thus representing an acceptable, but non-optimal, solution.

Figure 16:
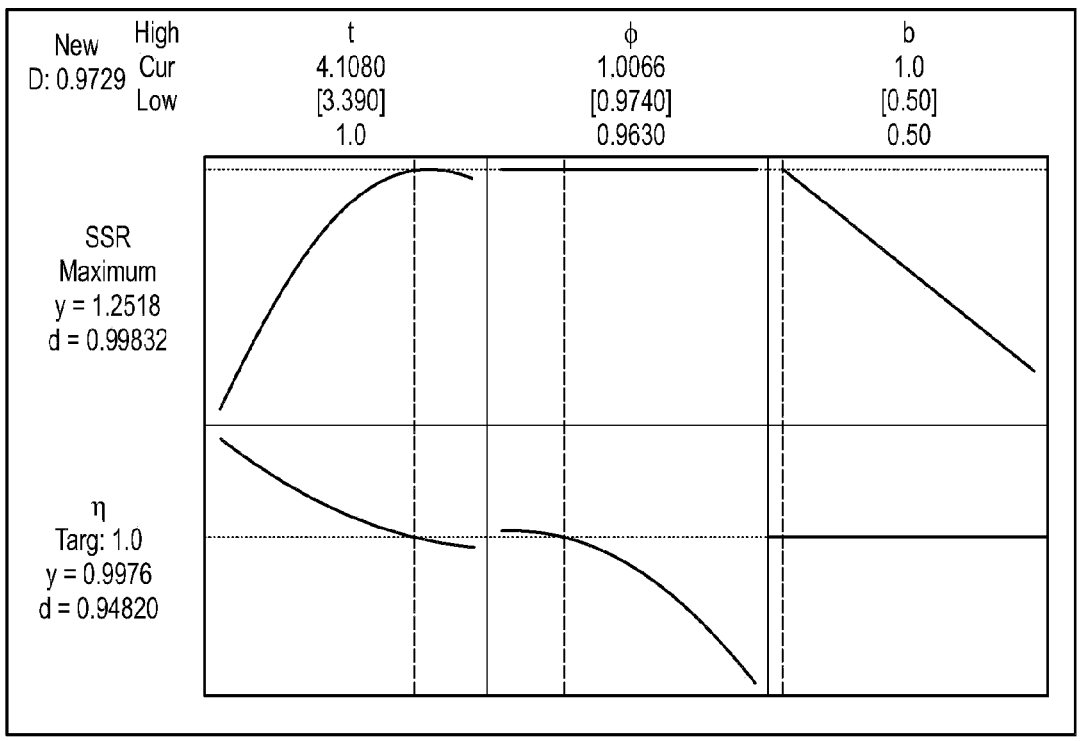

FIG. 16 shows the results of a second concept in the optimisation model. Desirability 'D'≈0.97, the second concept thus representing a 'better' design to that of the first concept (shown in FIG. 15).

Figure 17:
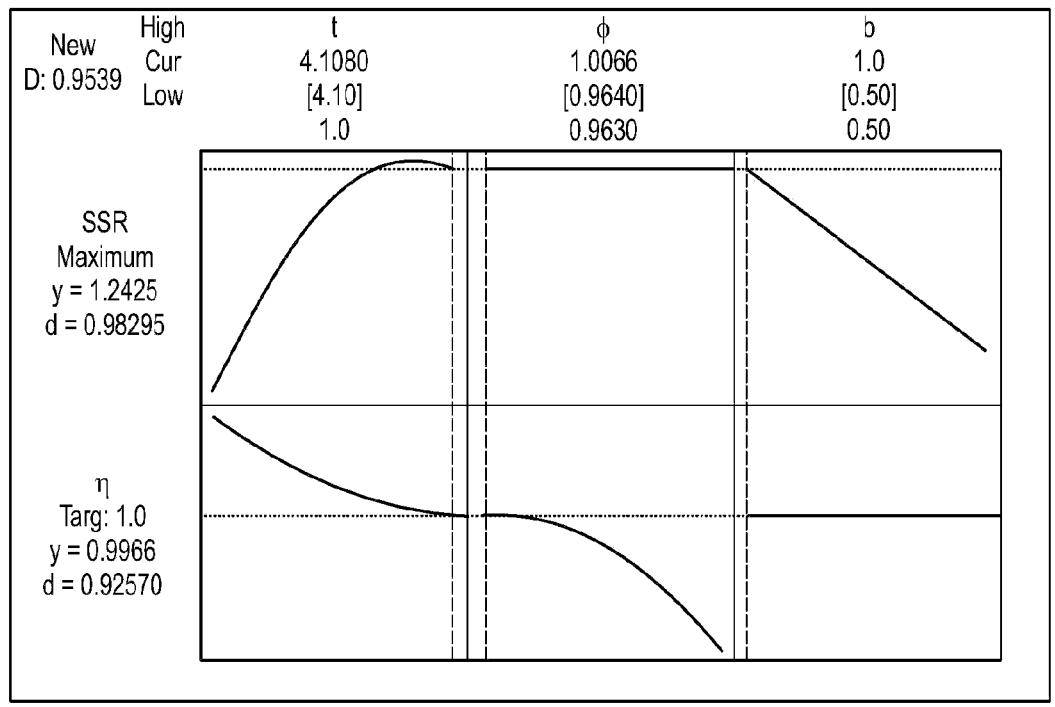

FIG. 17 shows the results of a third concept in the optimisation model. Desirability 'D'≈0.95, the third concept thus representing a less desirable design to that of the second concept (shown in FIG. 16).

Figure 18:
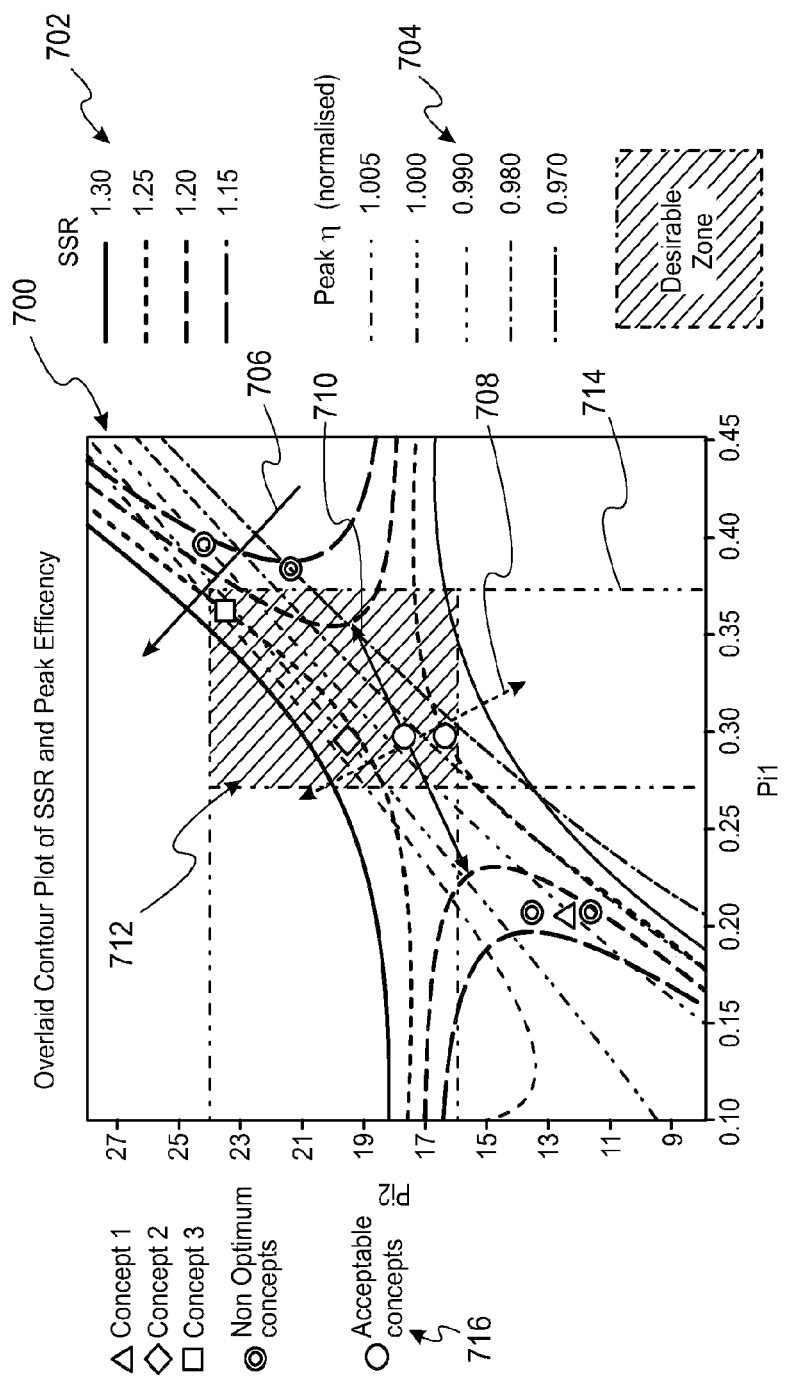
FIG. 18 is a contour plot displaying results from the optimisation model in accordance with the invention.

FIG. 18 is a contour plot 700 displaying results from the optimisation model described above, and using the durability and performance trade-off terms derived by the inventors.

Also plotted on the FIG. 18 plot are nine different vane concepts (having, in turn, a range of different neck thicknesses t, deck thicknesses b, chord lengths l and leading edge angles ∅).

On the X-axis a $\pi_1$ (otherwise referred to as the durability term) value is plotted, and on the Y-axis a $\pi_2$ (otherwise referred to as the performance trade-off term) is plotted. It will be recalled that the respective terms are defined as:

$$\text{Durability term} = \pi_1 = \frac{t}{b}$$

$$\text{Performance trade-off term} = \pi_2 = t(l\cos\emptyset)$$

Also indicated on the plot 700 are bands of SSR values (as indicated by the key 702), and bands of normalised peak efficiency (q) values (as indicated by the key 704).

The plot 700, in combination with the key 704, indicates that the normalised peak efficiency generally increases moving in a direction towards the top left of the plot, as indicated by arrow 706. Similarly, the plot 700, in combination with the key 702, indicates that the SSR value generally increases moving in directions towards the top left, or bottom right, of the plot, as indicated by arrow 708. Put another way, the SSR value generally decreases moving in a direction towards the bottom left, or top right, of the plot, as indicated by arrow 710.

The plot 700 indicates a 'desirable zone', which is shaded and labelled 712 in FIG. 18, in which both the SSR value, and the (normalised) peak efficiency value, are both at a desirable level. Specifically, the SSR value is high enough that the vane is durable, and offers a significant improvement over a baseline design (the baseline design having an SSR of 0.95), whilst the peak efficiency is high enough that the vane does not have an aerodynamic performance which is outside of an acceptable range (relative to the baseline vane design). Within the desirable zone, SSR bands are high performing and are greater than about 1.2 (e.g. the SSR value is at least about 1.2). Similarly, the peak efficiency is within ±3% of a baseline design (i.e. the peak efficiency is not compromised in order to obtain a higher SSR value). Put another way, the peak efficiency value is at least about 0.97 (the normalised value being calculated relative to a baseline design). The desirable zone 712 also falls within a range where the model can be used to reliably predict the durability and performance of the vane.

The desirable zone 712 is defined based upon the results of many iterations of different vane designs, and their respective peak efficiency and SSR values (relative to a baseline vane design). A selection of said results which, other than for the baseline concept, are all plotted on the plot 700, are indicated in a table shown in FIG. 19. The reference code column indicates the symbol used to plot the result, from FIG. 19, in the plot 700 of FIG. 18, for that result, or vane design. As indicated between FIGS. 18 and 19, concepts 2 and 3 fall within the desirable zone, along with two further 'acceptable' designs. Results indicated "Non-Opt" fall outside of the desirable zone 712 indicated in FIG. 18 (and therefore fail to provide a significantly improved SSR value and/or have a mean of peak efficiency value which is not within 3% of the baseline design mean of peak efficiency value).

By identifying the points where the desirable zone 712 intersects the X and Y-axes, a particularly high performing, and desirable, range of $\pi_1$ and $\pi_2$ values are ascertained. See, for example, line 714, indicating an upper limit of high performing $\pi_1$ term to be about 0.37.

The inventors have thus ascertained that a durability term $\pi_1$ greater than or equal to about 0.27 provides desirable durability characteristics (e.g. a high SSR ratio). Furthermore, a vane arrangement having a durability term $\pi_1$ falling within the range from about 0.27 to about 0.37, and more specifically from 0.27 to 0.37, also has desirable durability characteristics.

When a vane arrangement having a durability term $\pi_1$ which falls within the range about 0.27 to about 0.37 is also combined with a performance term $\pi_2$ falling within the range from about 16 to about 24, the vane arrangement has been found to be both durable (e.g. having a desirable thermomechanical fatigue performance) and high performing (e.g. having an efficiency within 3% of a baseline design efficiency). The inventors have therefore ascertained that compressors incorporating a vane arrangement which falls within this ratio range provide desirable operational characteristics. FIG. 20 indicates the preferred range of $\pi_1$ and $\pi_2$ values used to define the desirable zone.

The desirable zone 712 of FIG. 18, and aforementioned desirable ranges of $\pi_1$ and $\pi_2$ term, are supported by the fact that the concept 2 and 3 designs, plotted in FIG. 18 and having optimisation model data as shown in FIGS. 16 and 17 respectively, fall within this desirable range. This is in contrast to concept 1, which was indicated to be less desirable (in FIG. 15), which falls outside of the desirable zone 712 (and, indeed, desirable range of $\pi_1$ and $\pi_2$ values). For completeness, the specific $\pi_1$ and $\pi_2$ values respectively, associated with each of the four results falling within the desirable zone 712, are: (0.30, 18.65) [concept 2]; (0.36, 23.39) [concept 3]; (0.30, 16.72) [IT36]; and (0.30, 17.82) [IT34].

Although only a selection of results are plotted in FIG. 18, the aforementioned desirable technical effects are obtained across the desirable zone 712, and so across the range of $\pi_1$ and $\pi_2$ values indicated in FIG. 19.

In a further refinement, the performance and durability terms, $\pi_1$ and $\pi_2$ respectively, are divided by the compressor wheel diameter d. The terms may therefore be described as performance, and durability, terms parameterised with respect to compressor wheel diameter respectively. The compressor wheel diameter d refers to a diameter taken between radially outermost points of the blades 24 on a compressor wheel 12, like that labelled 52 in FIG. 1.

The inventors have ascertained that having a durability term, parameterised with respect to the wheel diameter, which is greater than or equal to about 0.0018 provides desirable thermomechanical fatigue performance. Furthermore, values falling within a narrower range of from about 0.0018 to about 0.0025 also define compressors that have desirable thermomechanical fatigue performance. These values are indicated in FIG. 21.

The performance trade-off term, parameterised with respect to the wheel diameter d, having a value from about 0.10 to about 0.16 has also been found to provide desirable performance and can be most reliably predicted using the model described herein.

A compressor configuration having a durability term, parameterised with respect to wheel diameter, having a value from 0.0018 to 0.0025, in combination with a performance trade-off term, parameterised with respect to wheel diameter, having a value from 0.10 to 0.16, has been found to provide a desirable level of both durability and performance. That is to say, such compressor configurations provide a desirable balance of both durability and efficiency.

Figures 22, 23, 24:
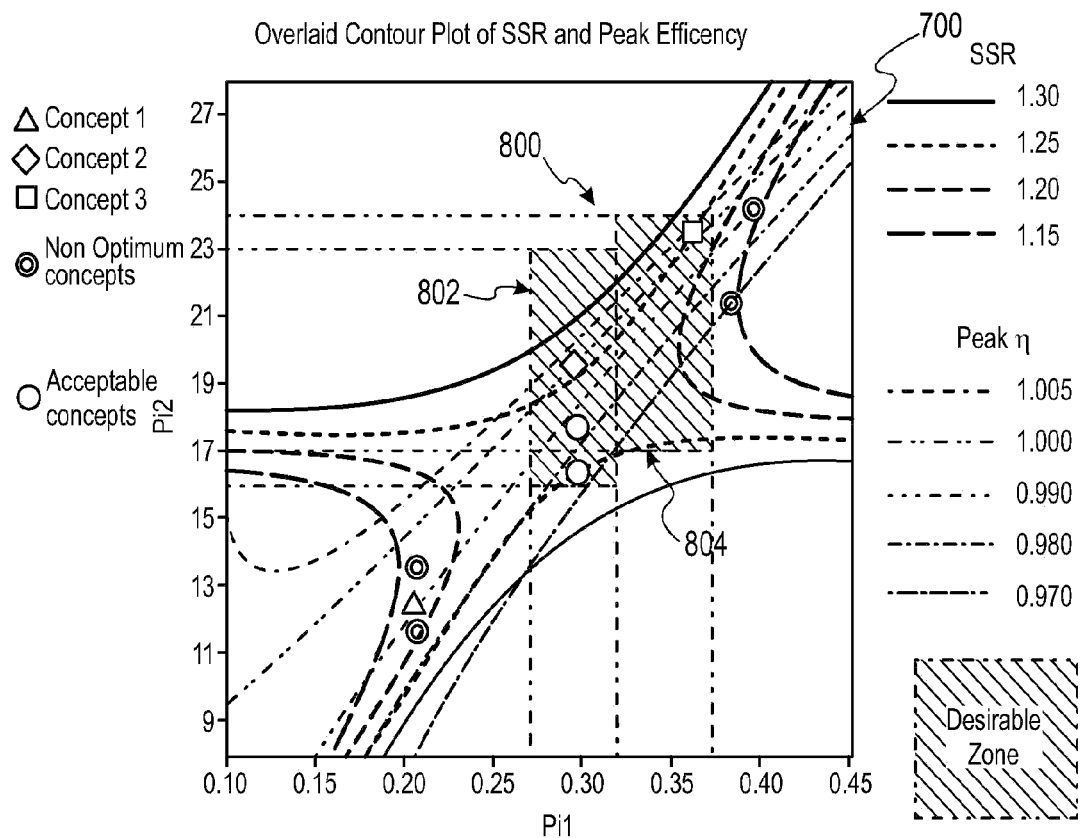
FIG. 22 is a contour plot showing a refined desirable zone.
FIGS. 23 and 24 are tables indicating desirable ranges of durability and performance trade-off term corresponding with the refined desirable zone shown in FIG. 22, according to an embodiment of the invention.

Turning to FIG. 22, the plot 700, from FIG. 18, is provided with an alternative definition of the desirable zone. Save for the 'refined' desirable zone, FIG. 22 is identical to FIG. 18.

In FIG. 22, a 'refined' desirable zone 800 comprises two constituent zones 802, 804. The $\pi_1$ and $\pi_2$ value ranges which define each of the constituent zones 802, 804 are indicated in the tables of FIGS. 23 and 24 respectively. FIG. 23 indicates values for the first constituent zone 802, and FIG. 24 indicates values for the second constituent zone 804.

The first constituent zone 802 is defined by: $0.27 \leq \pi_1 \leq 0.32$, and $16 \leq \pi_2 \leq 23$. The second constituent zone 804 is defined by: $0.32 \leq \pi_1 0.37$, and $17 \leq \pi_2 \leq 24$.

The refined desirable zone 800 can be expressed as the desirable zone 700 of FIG. 17 excluding, or disclaiming, the zones defined by the following ranges:

$0.27 \leq \pi_1 < 0.32$, and $23 < \pi_2 \leq 24$ (e.g. the top left rectangle removed from the desirable zone 800 relative to the desirable zone 700); and $0.32 < \pi_1 \leq 0.37$, and $16 \leq \pi_2 < 17$ (e.g. the bottom right rectangle removed from the desirable zone 800 relative to the desirable zone 700).

Figure 25:
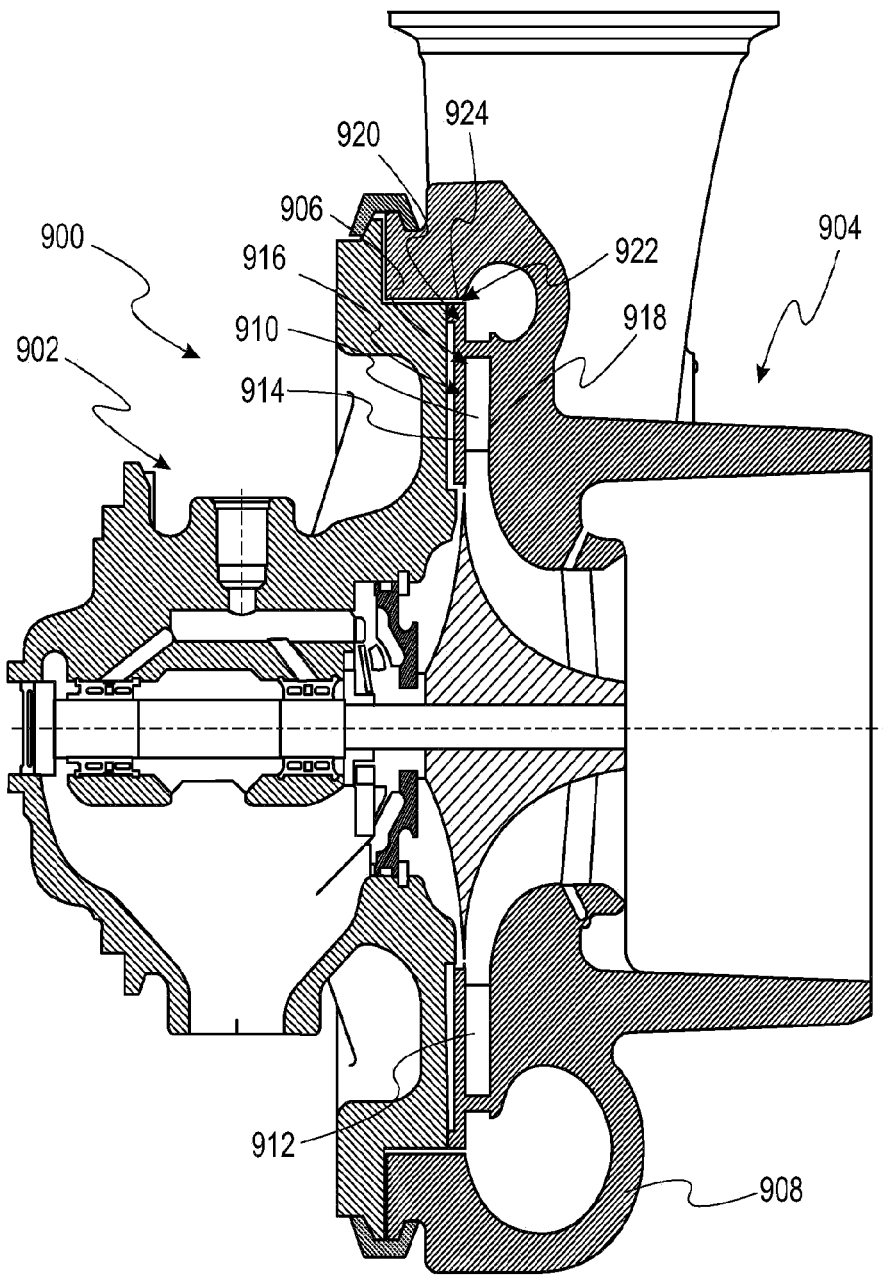
FIG. 25 is a schematic cross-section view of part of a turbocharger in accordance with another embodiment of the invention.

Turning to FIG. 25, a cross-section side view of part of a turbocharger 900 according to another embodiment is provided. Many features are shared in common with the turbocharger 2 shown in FIG. 1, and only the differences will be described in detail.

The turbocharger 900 comprises a bearing housing 902 which is the same as the bearing housing 6 described and illustrated in connection with FIG. 1. The turbocharger 900 further comprises a compressor 904 which differs from the compressor 4 of FIG. 1. Specifically, rather than the turbocharger 900 comprising a vane insert which is a separate component (like vane insert 27 of FIGS. 1 and 2), a vane arrangement 906 is integrally formed with a compressor cover 908. This is by virtue of axially outer ends of the vanes 910, 912 being integral with an adjacent surface 918 of the compressor 908.

The vanes 910, 912 may be said to extend between a first surface 914 of the vane deck 916 and the opposing wall 918 of the compressor cover 908. The vanes 910, 912 may be described as struts which attach the backplate 920 to the wall 918 (or compressor cover 908 more generally). A gap 922 may be provided between a radially outer end of the backplate 920 and the adjacent surface 924 of the compressor cover 908. Save for the above differences, the compressor cover 908 may share all features in common with the compressor cover 8 described in connection with FIG. 1.

Turning to FIG. 26, a table of values is provided. FIG. 26 indicates parameters defining twelve different vane designs, along with associated efficiency, SSR, and $\pi_1$ and $\pi_2$ values.

Following the aforementioned development work, in which the inventors derived the $\pi_1$ and $\pi_2$ terms and the initial preferred ranges of the same, further work was carried out to on a number of different vane designs. A selection of the results of the same is provided in FIG. 26.

It will be recalled that the inventors set out to determine parameters, and ranges of the same, which define a desirable balance between durability and performance for vanes of a vane insert. Put another way, it was desired that the durability of vanes be improved but not at an undue cost of performance.

FIG. 26 includes a baseline vane design (data indicated in bold), as well as eleven other designs. Concepts 1, 2 and 3 correspond to those shown in FIGS. 18 and 22.

From FIG. 26 it will be appreciated that, other than designs G and H (highlighted in FIG. 26, and which will be described below), all of the other non-baseline concepts offer improved, or near-equivalent (e.g. within ~3/4%), efficiency to that of the baseline vane design. Furthermore, this is achieved whilst the SSR value of the vane designs is improved significantly over the baseline design. Put another way, the durability of the vanes is better than the baseline, whilst the performance is either unaffected or only slightly reduced (in comparison to the baseline).

Based upon the data in FIG. 26, it is observed that, as well as the previously indicated desirable ranges of $\pi_1$ (0.27 to 0.37) and $\pi_2$ (16 to 23), the same technical effect (e.g. improved durability without unduly affecting performance) is also obtained for vane designs falling slightly outside of these ranges. For example, FIG. 26 indicates that any vane design having about $0.21 \leq \pi_1$ offers an increased SSR value over the baseline design (e.g. offers improved durability). Similarly, for vane designs having $0.21 \leq \pi_1$, the efficiency is within an acceptable range of the baseline value for $11 \leq \pi_2$. Described another way, for vane designs having $0.21 \leq \pi_1$, the $\leq \pi_2$ range can also be broadened whilst still obtaining the technical effect that the performance is not unduly affected.

The data included in FIG. 26 indicates that a desirable balance of both durability and performance is obtained for vane designs falling within the following broadened ranges:
$0.21 \leq \pi_1 \leq 0.38$; and
$11 \leq \pi_2 \leq 25$.

The initially identified (narrower) ranges of $\pi_1$ and $\pi_2$:
$0.27 \leq \pi_1 \leq 0.37$; and
$16 \leq \pi_2 \leq 24$;
can therefore be broadened accordingly, whilst still obtaining the desirable balance of durability and performance.

Vane designs G and H fall outside of the broad, and narrowed, ranges of $\pi_1$ and $\pi_2$ mentioned above. Whilst these vane designs offer an acceptable level of performance, in comparison to the baseline, the SSR values are significantly lower, indicating a less-durable vane. Accordingly, the selected $\pi_1$ and $\pi_2$ ranges therefore provide a reliable indication of the durability/performance of a vane design, without the need to carry out further analysis (to ascertain the efficiency and/or durability) on the vane and/or complex iterative design methods.

Of note, although the deck thickness b is 3 mm for each of the desirable vane designs indicated in FIG. 26, it will be appreciated that the thickness can be adjusted accordingly in other embodiments.

For the broadened selected $\pi_1$ and $\pi_2$ ranges, a durability term, parameterised with respect to the wheel diameter, which is greater than or equal to about 0.0014 provides desirable thermomechanical fatigue performance. Furthermore, values falling within a narrower range of from about 0.0014 to about 0.0026 also define compressors that have desirable thermomechanical fatigue performance. The performance trade-off term, parameterised with respect to the wheel diameter d, having a value from about 0.069 to about 0.17 has also been found to provide desirable performance. A compressor configuration having a durability term, parameterised with respect to wheel diameter, having a value from 0.0014 to 0.0026, in combination with a performance trade-off term, parameterised with respect to wheel diameter, having a value from 0.069 to 0.17, has been found to provide a desirable level of both durability and performance. That is to say, such compressor configurations provide a desirable balance of both durability and efficiency.

Figure 27:
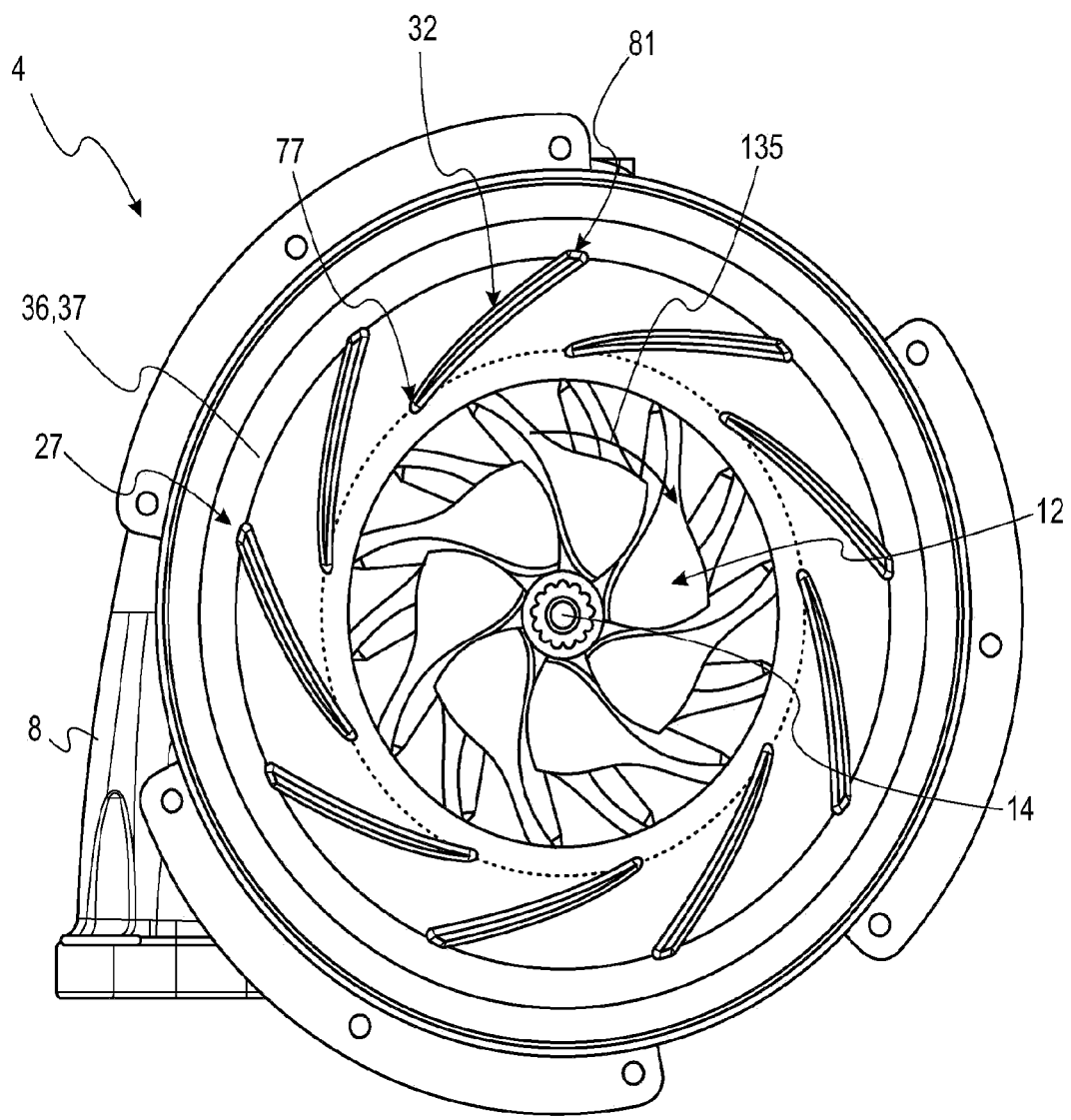
FIG. 27 shows the compressor of FIG. 1 in isolation.

Turning to FIG. 27, the compressor 4 of FIG. 1 is shown in isolation.

As previously described, the compressor 4 comprises the compressor cover 8, compressor wheel 8 and vane insert 27. The vane deck 36 of the vane insert 27 is visible, as is the first surface 37 from which vanes 32 project (only one of the nine vanes is labelled).

The compressor wheel 8 is configured to rotate about axis 14. Described another way, the compressor wheel 8 is rotatable about the axis 14. In the illustrated embodiment the compressor wheel 8 is rotatable in a clockwise direction as indicated by arrow 135 (when viewed facing the first surface 37 of the vane deck 36). The direction of rotation of the compressor wheel 8, in use, is generally the same direction in which the vanes (e.g. 32) extend from the leading edge 77 to the trailing edge region 81 (e.g. from the leading edge to the trailing edge).

Figure 28:
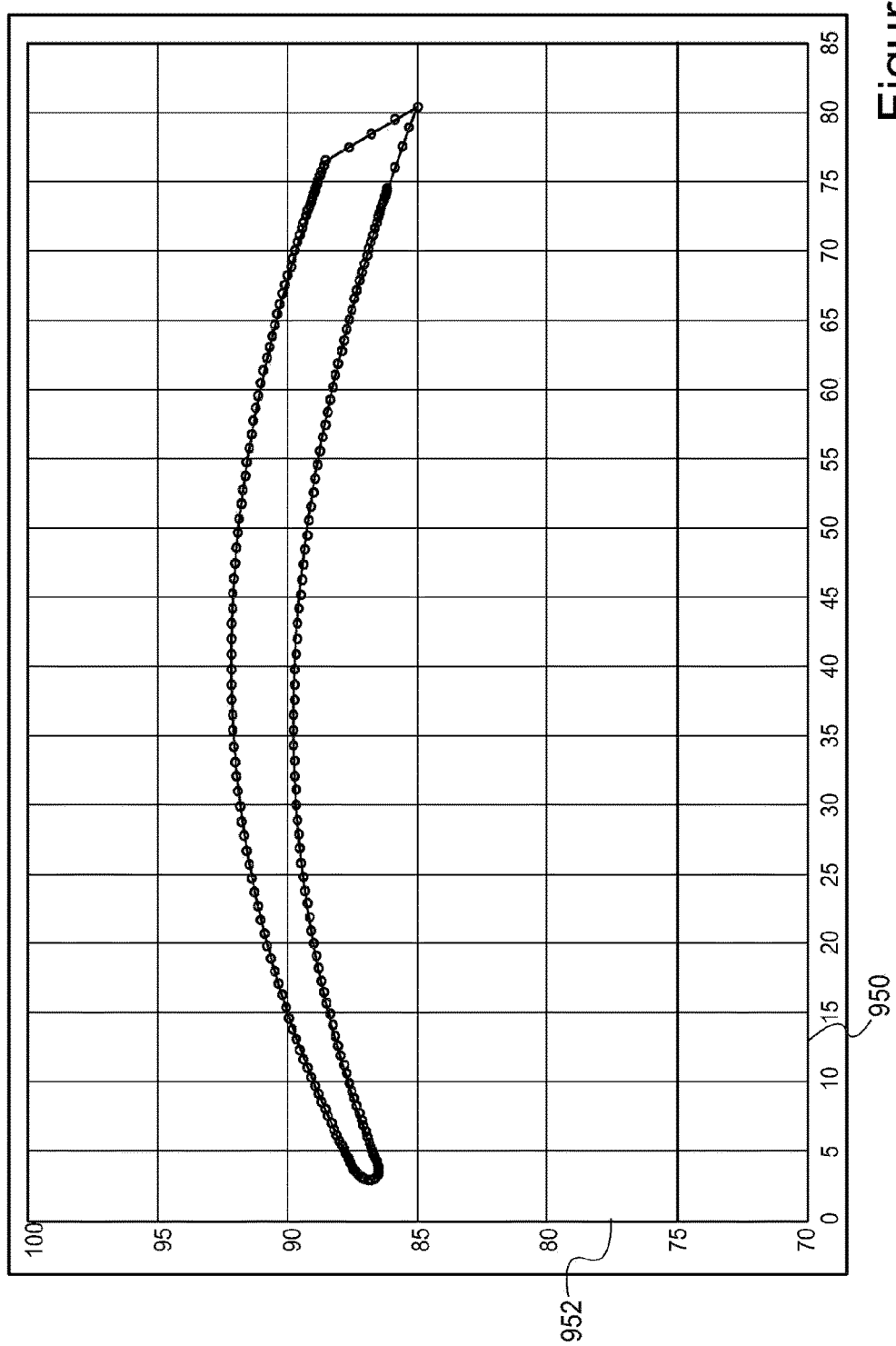
FIG. 28 is a plot showing the profile of a vane according to an embodiment of the invention.

Turning to FIG. 28, the coordinates defining a profile of a vane in accordance with an embodiment of the invention are plotted. The vane design corresponds to vane design concept 2 of FIG. 26. The profile of the vane corresponds to the profile shown in, for example, FIG. 6. The profile may be described as the geometry of a cross-section of the vane (e.g. in a plane normal to the axial direction). The vane preferably maintains a uniform cross-section along its axial extent (e.g. has a constant cross-section). For the avoidance of doubt, the X and Y axes, according to which the 'X values' and 'Y values' data points are plotted, are labelled 950, 952 respectively in FIG. 28.

The vane profile plotted in FIG. 28 gives rise to a desirable balance of durability and performance for the reasons explained throughout this document.

It will be appreciated that the profile plotted in FIG. 28 may be scaled accordingly.

Provided below is a table of data points which correspond to the vane plotted in FIG. 28. The columns "Plot data" includes the X and Y coordinates used to plot the profile in FIG. 28. The "Normalised data" columns include X and Y coordinates when a leading edge is selected as a (0,0) point, with the other coordinates being provided relative to that point.

TABLE 1

Data points used to plot the profile in FIG. 28

| Plot data | | Normalised data | |
|---|---|---|---|
| X values | Y values | X values | Y values |
| 3.73902 | 87.45548 | 0.75702 | 0.6817 |
| 3.51516 | 87.37642 | 0.53316 | 0.60264 |
| 3.31627 | 87.27399 | 0.33427 | 0.50021 |
| 3.1549 | 87.15476 | 0.1729 | 0.38098 |
| 3.04121 | 87.02619 | 0.05921 | 0.25241 |
| 2.98236 | 86.89654 | 0.00036 | 0.12276 |
| 2.982 | 86.77378 | 0 | 0 |
| 3.04003 | 86.66562 | 0.05803 | −0.10816 |
| 3.15267 | 86.5787 | 0.17067 | −0.19508 |
| 3.31271 | 86.51807 | 0.33071 | −0.25571 |
| 3.51005 | 86.48737 | 0.52805 | −0.28641 |
| 3.73233 | 86.48834 | 0.75033 | −0.28544 |
| 3.96577 | 86.52064 | 0.98377 | −0.25314 |
| 3.96577 | 86.52064 | 0.98377 | −0.25314 |
| 4.062 | 86.54015 | 1.08 | −0.23363 |
| 4.1913 | 86.56622 | 1.2093 | −0.20756 |
| 4.35361 | 86.59887 | 1.37161 | −0.17491 |
| 4.5488 | 86.63788 | 1.5668 | −0.1359 |
| 4.77669 | 86.68328 | 1.79469 | −0.0905 |
| 5.03708 | 86.73477 | 2.05508 | −0.03901 |
| 5.32975 | 86.79215 | 2.34775 | 0.01837 |
| 5.65444 | 86.85534 | 2.67244 | 0.08156 |
| 6.01087 | 86.92394 | 3.02887 | 0.15016 |
| 6.39871 | 86.99786 | 3.41671 | 0.22408 |
| 6.81764 | 87.07662 | 3.83564 | 0.30284 |
| 7.2673 | 87.16013 | 4.2853 | 0.38635 |
| 7.74727 | 87.24779 | 4.76527 | 0.47401 |
| 8.25714 | 87.33944 | 5.27514 | 0.56566 |
| 8.79649 | 87.43467 | 5.81449 | 0.66089 |
| 9.36482 | 87.53291 | 6.38282 | 0.75913 |
| 9.96165 | 87.63387 | 6.97965 | 0.86009 |
| 10.58646 | 87.73707 | 7.60446 | 0.96329 |
| 11.23869 | 87.84213 | 8.25669 | 1.06835 |
| 11.91778 | 87.94847 | 8.93578 | 1.17469 |
| 12.62309 | 88.05561 | 9.64109 | 1.28183 |
| 13.35404 | 88.16327 | 10.37204 | 1.38949 |
| 14.10988 | 88.27077 | 11.12788 | 1.49699 |
| 14.88991 | 88.37775 | 11.90791 | 1.60397 |
| 15.69363 | 88.48371 | 12.71163 | 1.70993 |
| 16.52 | 88.58818 | 13.538 | 1.8144 |
| 17.36843 | 88.69071 | 14.38643 | 1.91693 |
| 18.23808 | 88.7908 | 15.25608 | 2.01702 |
| 19.12804 | 88.88809 | 16.14604 | 2.11431 |
| 20.03761 | 88.98211 | 17.05561 | 2.20833 |
| 20.96586 | 89.07248 | 17.98386 | 2.2987 |
| 21.91188 | 89.15874 | 18.92988 | 2.38496 |
| 22.87476 | 89.24052 | 19.89276 | 2.46674 |
| 23.85357 | 89.31734 | 20.87157 | 2.54356 |
| 24.84742 | 89.38905 | 21.86542 | 2.61527 |
| 25.85518 | 89.45508 | 22.87318 | 2.6813 |
| 26.87605 | 89.51525 | 23.89405 | 2.74147 |
| 27.90881 | 89.56912 | 24.92681 | 2.79534 |
| 28.95256 | 89.6166 | 25.97056 | 2.84282 |
| 30.00638 | 89.65723 | 27.02438 | 2.88345 |
| 31.06906 | 89.69095 | 28.08706 | 2.91717 |
| 32.13971 | 89.71769 | 29.15771 | 2.94391 |
| 33.21722 | 89.7372 | 30.23522 | 2.96342 |
| 34.30058 | 89.7496 | 31.31858 | 2.97582 |
| 35.3886 | 89.75473 | 32.4066 | 2.98095 |
| 36.48028 | 89.75284 | 33.49828 | 2.97906 |
| 37.57472 | 89.74384 | 34.59272 | 2.97006 |
| 38.67071 | 89.72789 | 35.68871 | 2.95411 |
| 39.76729 | 89.70542 | 36.78529 | 2.93164 |
| 40.86334 | 89.67646 | 37.88134 | 2.90268 |
| 41.95789 | 89.64154 | 38.97589 | 2.86776 |
| 43.04963 | 89.60072 | 40.06763 | 2.82694 |
| 44.13768 | 89.55433 | 41.15568 | 2.78055 |
| 45.22084 | 89.5026 | 42.23884 | 2.72882 |
| 46.29803 | 89.44587 | 43.31603 | 2.67209 |
| 47.36814 | 89.38428 | 44.38614 | 2.6105 |
| 48.43029 | 89.31796 | 45.44829 | 2.54418 |
| 49.48319 | 89.24725 | 46.50119 | 2.47347 |
| 50.52603 | 89.17239 | 47.54403 | 2.39861 |
| 51.55773 | 89.09351 | 48.57573 | 2.31973 |
| 52.57729 | 89.01085 | 49.59529 | 2.23707 |
| 53.58382 | 88.92463 | 50.60182 | 2.15085 |
| 54.57625 | 88.83539 | 51.59425 | 2.06161 |
| 55.55385 | 88.74316 | 52.57185 | 1.96938 |
| 56.51547 | 88.64838 | 53.53347 | 1.8746 |
| 57.46019 | 88.55127 | 54.47819 | 1.77749 |
| 58.38723 | 88.45218 | 55.40523 | 1.6784 |
| 59.29571 | 88.35142 | 56.31371 | 1.57764 |
| 60.18483 | 88.24932 | 57.20283 | 1.47554 |
| 61.0537 | 88.14622 | 58.0717 | 1.37244 |
| 61.90154 | 88.04254 | 58.91954 | 1.26876 |
| 62.72765 | 87.9385 | 59.74565 | 1.16472 |
| 63.53106 | 87.83465 | 60.54906 | 1.06087 |
| 64.31117 | 87.73119 | 61.32917 | 0.95741 |
| 65.06718 | 87.62847 | 62.08518 | 0.85469 |
| 65.79852 | 87.52679 | 62.81652 | 0.75301 |
| 66.5043 | 87.42659 | 63.5223 | 0.65281 |
| 67.18402 | 87.32819 | 64.20202 | 0.55441 |
| 67.83709 | 87.2317 | 64.85509 | 0.45792 |
| 68.46283 | 87.13766 | 65.48083 | 0.36388 |
| 69.06075 | 87.04637 | 66.07875 | 0.27259 |
| 69.63015 | 86.95796 | 66.64815 | 0.18418 |
| 70.17064 | 86.87274 | 67.18864 | 0.09896 |
| 70.68174 | 86.79114 | 67.69974 | 0.01736 |
| 71.16295 | 86.71327 | 68.18095 | −0.06051 |
| 71.61388 | 86.63944 | 68.63188 | −0.13434 |
| 72.03404 | 86.56987 | 69.05204 | −0.20391 |
| 72.42313 | 86.50487 | 69.44113 | −0.26891 |
| 72.78077 | 86.44445 | 69.79877 | −0.32933 |
| 73.10666 | 86.38902 | 70.12466 | −0.38476 |
| 73.4005 | 86.3386 | 70.4185 | −0.43518 |
| 73.662 | 86.29349 | 70.68 | −0.48029 |
| 73.89097 | 86.2537 | 70.90897 | −0.52008 |
| 74.08711 | 86.21945 | 71.10511 | −0.55433 |
| 74.25043 | 86.19092 | 71.26843 | −0.58286 |
| 74.38062 | 86.16794 | 71.39862 | −0.60584 |
| 74.47769 | 86.15089 | 71.49569 | −0.62289 |
| 74.54134 | 86.1396 | 71.55934 | −0.63418 |
| 76.02585 | 85.87266 | 73.04385 | −0.90112 |
| 77.49742 | 85.59905 | 74.51542 | −1.17473 |
| 78.95741 | 85.31755 | 75.97541 | −1.45623 |
| 80.41803 | 85.0164 | 77.43603 | −1.75738 |
| 80.41803 | 85.0164 | 77.43603 | −1.75738 |
| 79.48564 | 85.88874 | 76.50364 | −0.88504 |
| 78.51856 | 86.77378 | 75.53656 | 0 |
| 77.54151 | 87.64795 | 74.55951 | 0.87417 |
| 76.51202 | 88.54804 | 73.53002 | 1.77426 |
| 76.51202 | 88.54804 | 73.53002 | 1.77426 |
| 76.14357 | 88.62003 | 73.16157 | 1.84625 |
| 75.77441 | 88.69156 | 72.79241 | 1.91778 |
| 75.40433 | 88.76241 | 72.42233 | 1.98863 |
| 75.03352 | 88.83268 | 72.05152 | 2.0589 |
| 74.9691 | 88.8448 | 71.9871 | 2.07102 |
| 74.87108 | 88.86328 | 71.88908 | 2.0895 |
| 74.73955 | 88.88791 | 71.75755 | 2.11413 |
| 74.5746 | 88.9187 | 71.5926 | 2.14492 |
| 74.37635 | 88.95543 | 71.39435 | 2.18165 |
| 74.14498 | 88.9982 | 71.16298 | 2.22442 |
| 73.88069 | 89.04661 | 70.89869 | 2.27283 |
| 73.58377 | 89.10053 | 70.60177 | 2.32675 |
| 73.25441 | 89.15988 | 70.27241 | 2.3861 |
| 72.89281 | 89.22434 | 69.91081 | 2.45056 |
| 72.49946 | 89.29369 | 69.51746 | 2.51991 |
| 72.07465 | 89.36772 | 69.09265 | 2.59394 |
| 71.61867 | 89.44603 | 68.63667 | 2.67225 |
| 71.13202 | 89.52849 | 68.15002 | 2.75471 |
| 70.61507 | 89.6147 | 67.63307 | 2.84092 |
| 70.06823 | 89.70433 | 67.08623 | 2.93055 |
| 69.49208 | 89.79717 | 66.51008 | 3.02339 |

TABLE 1-continued

Data points used to plot the profile in FIG. 28

| Plot data | | Normalised data | |
|---|---|---|---|
| X values | Y values | X values | Y values |
| 68.8871 | 89.89271 | 65.9051 | 3.11893 |
| 68.25379 | 89.99062 | 65.27179 | 3.21684 |
| 67.59274 | 90.09068 | 64.61074 | 3.3169 |
| 66.90452 | 90.19238 | 63.92252 | 3.4186 |
| 66.18984 | 90.29528 | 63.20784 | 3.5215 |
| 65.44917 | 90.39918 | 62.46717 | 3.6254 |
| 64.6834 | 90.50355 | 61.7014 | 3.72977 |
| 63.89312 | 90.60795 | 60.91112 | 3.83417 |
| 63.07902 | 90.71207 | 60.09702 | 3.93829 |
| 62.24187 | 90.81548 | 59.25987 | 4.0417 |
| 61.38238 | 90.91786 | 58.40038 | 4.14408 |
| 60.50152 | 91.01858 | 57.51952 | 4.2448 |
| 59.59998 | 91.1174 | 56.61798 | 4.34362 |
| 58.67855 | 91.2137 | 55.69655 | 4.43992 |
| 57.73811 | 91.30735 | 54.75611 | 4.53357 |
| 56.77975 | 91.39772 | 53.79775 | 4.62394 |
| 55.80436 | 91.48457 | 52.82236 | 4.71079 |
| 54.81272 | 91.56758 | 51.83072 | 4.7938 |
| 53.80594 | 91.64641 | 50.82394 | 4.87263 |
| 52.78479 | 91.72072 | 49.80279 | 4.94694 |
| 51.75046 | 91.79019 | 48.76846 | 5.01641 |
| 50.70385 | 91.85447 | 47.72185 | 5.08069 |
| 49.64595 | 91.91334 | 46.66395 | 5.13956 |
| 48.57795 | 91.96665 | 45.59595 | 5.19287 |
| 47.50084 | 92.01397 | 44.51884 | 5.24019 |
| 46.41562 | 92.05537 | 43.43362 | 5.28159 |
| 45.32328 | 92.0905 | 42.34128 | 5.31672 |
| 44.22502 | 92.11924 | 41.24302 | 5.34546 |
| 43.12173 | 92.14135 | 40.13973 | 5.36757 |
| 42.0146 | 92.15668 | 39.0326 | 5.3829 |
| 40.90464 | 92.16501 | 37.92264 | 5.39123 |
| 39.79291 | 92.16599 | 36.81091 | 5.39221 |
| 38.68043 | 92.15949 | 35.69843 | 5.38571 |
| 37.56849 | 92.14527 | 34.58649 | 5.37149 |
| 36.45808 | 92.1233 | 33.47608 | 5.34952 |
| 35.35049 | 92.09312 | 32.36849 | 5.31934 |
| 34.24683 | 92.055 | 31.26483 | 5.28122 |
| 33.1482 | 92.00891 | 30.1662 | 5.23513 |
| 32.0558 | 91.95489 | 29.0738 | 5.18111 |
| 30.97063 | 91.89303 | 27.98863 | 5.11925 |
| 29.89391 | 91.82347 | 26.91191 | 5.04969 |
| 28.82674 | 91.74647 | 25.84474 | 4.97269 |
| 27.77012 | 91.66231 | 24.78812 | 4.88853 |
| 26.72518 | 91.57121 | 23.74318 | 4.79747 |
| 25.69302 | 91.47364 | 22.71102 | 4.69986 |
| 24.67445 | 91.36996 | 21.69245 | 4.59618 |
| 23.6707 | 91.26037 | 20.6887 | 4.48659 |
| 22.68257 | 91.14554 | 19.70057 | 4.37176 |
| 21.71108 | 91.02574 | 18.72908 | 4.25196 |
| 20.75705 | 90.90133 | 17.77505 | 4.12755 |
| 19.82158 | 90.77288 | 16.83958 | 3.9991 |
| 18.90531 | 90.64087 | 15.92331 | 3.86709 |
| 18.00934 | 90.50566 | 15.02734 | 3.73188 |
| 17.13438 | 90.36773 | 14.15238 | 3.59395 |
| 16.28117 | 90.22765 | 13.29917 | 3.45387 |
| 15.45061 | 90.0859 | 12.46861 | 3.31212 |
| 14.64342 | 89.94284 | 11.66142 | 3.16906 |
| 13.86043 | 89.79924 | 10.87843 | 3.02546 |
| 13.10214 | 89.6554 | 10.12014 | 2.88162 |
| 12.36931 | 89.51189 | 9.38731 | 2.73811 |
| 11.66262 | 89.36927 | 8.68062 | 2.59549 |
| 10.98267 | 89.22814 | 8.00067 | 2.45436 |
| 10.33002 | 89.08888 | 7.34802 | 2.3151 |
| 9.70524 | 88.95205 | 6.72324 | 2.17827 |
| 9.10885 | 88.81816 | 6.12685 | 2.04438 |
| 8.54135 | 88.68777 | 5.55935 | 1.91399 |
| 8.00319 | 88.56128 | 5.02119 | 1.7875 |
| 7.49483 | 88.43927 | 4.51283 | 1.66549 |
| 7.01666 | 88.32222 | 4.03466 | 1.54844 |
| 6.56905 | 88.21063 | 3.58705 | 1.43685 |
| 6.15232 | 88.10488 | 3.17032 | 1.3311 |
| 5.76679 | 88.00536 | 2.78479 | 1.23158 |
| 5.41275 | 87.91266 | 2.43075 | 1.13888 |
| 5.09045 | 87.82708 | 2.10845 | 1.0533 |
| 4.80013 | 87.74901 | 1.81813 | 0.97523 |
| 4.54517 | 87.67883 | 1.55997 | 0.90505 |
| 4.31616 | 87.61675 | 1.33416 | 0.84297 |
| 4.12286 | 87.56316 | 1.14086 | 0.78938 |
| 3.96217 | 87.51825 | 0.98017 | 0.74447 |
| 3.83423 | 87.48232 | 0.85223 | 0.70854 |
| 3.73902 | 87.45548 | 0.75702 | 0.6817 |

Throughout this document it will be appreciated that the durability term, and performance trade-off term, may be used in isolation of one another, or in combination with one another, to define a high performing vane arrangement.

The vane insert may be described as a vaned insert.

A vane arrangement having 9 vanes may be described as a low solidity vane design (LSVD). A vane arrangement having 17 vanes may be described as a high solidity vane design (HSVD). The durability and performance trade-off terms cover vane arrangements having different solidities (e.g. LSVD, HSVD, and solidities in between).

Parameterising the performance trade-off and/or durability terms with respect to wheel diameter d means that the terms can be used provide desirable compressor configurations for different frame sizes. It will be appreciated that frame size is generally proportional to the compressor wheel diameter d. Example values of compressor wheel diameter d include from around 150 mm to around 190 mm. The compressor wheel diameter d may be at least around 50 mm. The compressor wheel diameter d may be at least around 100 mm. The compressor wheel diameter d may be up to around 200 mm. The compressor wheel diameter d may be around 151 mm.

Throughout this document, efficiency values were obtained/simulated using CFD analysis. Similarly, SSR values were obtained through thermal stress analysis simulations.

The vane arrangement may be cast. The vane arrangement may be manufactured from a forged billet.

The deck thickness b may be as low as around 3 mm if manufactured using conventional methods, or be reduced below 3 mm if manufactured using an additive manufacture process. The deck thickness b may be at least around 1.5 mm. The deck thickness b may be up to around 6 mm.

Throughout this document, normalised values are normalised relative to a baseline vane design.

Examples according to the disclosure may be formed using an additive manufacturing process. A common example of additive manufacturing is 3D printing; however, other methods of additive manufacturing are available. Rapid prototyping or rapid manufacturing are also terms which may be used to describe additive manufacturing processes.

As used herein, "additive manufacturing" refers generally to manufacturing processes wherein successive layers of material(s) are provided on each other to "build-up" layer-by-layer or "additively fabricate", a three-dimensional component. This is compared to some subtractive manufacturing methods (such as milling or drilling), wherein material is successively removed to fabricate the part. The successive layers generally fuse together to form a monolithic component which may have a variety of integral sub-components. In particular, the manufacturing process may allow an example of the disclosure to be integrally formed and include a variety of features not possible when using prior manufacturing methods.

Additive manufacturing methods described herein enable manufacture to any suitable size and shape with various features which may not have been possible using prior manufacturing methods. Additive manufacturing can create complex geometries without the use of any sort of tools, molds or fixtures, and with little or no waste material. Instead of machining components from solid billets of plastic or metal, much of which is cut away and discarded, the only material used in additive manufacturing is what is required to shape the part.

Suitable additive manufacturing techniques in accordance with the present disclosure include, for example, Fused Deposition Modeling (FDM), Selective Laser Sintering (SLS), 3D printing such as by inkjets and laserjets, Stereolithography (SLA), Direct Selective Laser Sintering (DSLS), Electron Beam Sintering (EBS), Electron Beam Melting (EBM), Laser Engineered Net Shaping (LENS), Electron Beam Additive Manufacturing (EBAM), Laser Net Shape Manufacturing (LNSM), Direct Metal Deposition (DMD), Digital Light Processing (DLP), Continuous Digital Light Processing (CDLP), Direct Selective Laser Melting (DSLM), Selective Laser Melting (SLM), Direct Metal Laser Melting (DMLM), Direct Metal Laser Sintering (DMLS), Material Jetting (MJ), NanoParticle Jetting (NPJ), Drop On Demand (DOD), Binder Jetting (BJ), Multi Jet Fusion (MJF), Laminated Object Manufacturing (LOM) and other known processes. Binder Jetting has been found to be particularly effective for manufacturing the components disclosed herein.

The additive manufacturing processes described herein may be used for forming components using any suitable material. For example, the material may be plastic, metal, composite, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in additive manufacturing processes which may be suitable for the fabrication of examples described herein. Stainless steel, in particular grade AISI 316L, is a preferred material for use in manufacturing the components disclosed herein.

As noted above, the additive manufacturing process disclosed herein allows a single component to be formed from multiple materials. Thus, the examples described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

Additive manufacturing processes typically fabricate components based on three-dimensional (3D) information, for example a three-dimensional computer model (or design file), of the component.

Accordingly, examples described herein not only include products or components as described herein, but also methods of manufacturing such products or components via additive manufacturing and computer software, firmware or hardware for controlling the manufacture of such products via additive manufacturing.

The structure of one or more parts of the product may be represented digitally in the form of a design file. A design file, or computer aided design (CAD) file, is a configuration file that encodes one or more of the surface or volumetric configuration of the shape of the product. That is, a design file represents the geometrical arrangement or shape of the product.

Design files can take any now known or later developed file format. For example, design files may be in the Stereolithography or "Standard Tessellation Language" (.stl) format which was created for stereolithography CAD programs of 3D Systems, or the Additive Manufacturing File (.amf) format, which is an American Society of Mechanical Engineers (ASME) standard that is an extensible markup-language (XML) based format designed to allow any CAD software to describe the shape and composition of any three-dimensional object to be fabricated on any additive manufacturing printer.

Further examples of design file formats include AutoCAD (.dwg) files, Blender (.blend) files, Parasolid (.x_t) files, 3D Manufacturing Format (.3mf) files, Autodesk (3ds) files, Collada (.dae) files and Wavefront (.obj) files, although many other file formats exist.

Design files can be produced using modelling (e.g. CAD modelling) software and/or through scanning the surface of a product to measure the surface configuration of the product.

Once obtained, a design file may be converted into a set of computer executable instructions that, once executed by a processer, cause the processor to control an additive manufacturing apparatus to produce a product according to the geometrical arrangement specified in the design file. The conversion may convert the design file into slices or layers that are to be formed sequentially by the additive manufacturing apparatus. The instructions (otherwise known as geometric code or "G-code") may be calibrated to the specific additive manufacturing apparatus and may specify the precise location and amount of material that is to be formed at each stage in the manufacturing process. As discussed above, the formation may be through deposition, through sintering, or through any other form of additive manufacturing method.

The code or instructions may be translated between different formats, converted into a set of data signals and transmitted, received as a set of data signals and converted to code, stored, etc., as necessary. The instructions may be an input to the additive manufacturing system and may come from a part designer, an intellectual property (IP) provider, a design company, the operator or owner of the additive manufacturing system, or from other sources. An additive manufacturing system may execute the instructions to fabricate the product using any of the technologies or methods disclosed herein.

Design files or computer executable instructions may be stored in a (transitory or non-transitory) computer readable storage medium (e.g., memory, storage system, etc.) storing code, or computer readable instructions, representative of the product to be produced. As noted, the code or computer readable instructions defining the product that can be used to physically generate the object, upon execution of the code or instructions by an additive manufacturing system. For example, the instructions may include a precisely defined 3D model of the product and can be generated from any of a large variety of well-known computer aided design (CAD) software systems such as AutoCAD®, TurboCAD®, DesignCAD 3D Max, etc. Alternatively, a model or prototype of the component may be scanned to determine the three-dimensional information of the component.

Accordingly, by controlling an additive manufacturing apparatus according to the computer executable instructions, the additive manufacturing apparatus can be instructed to print out one or more parts of the product. These can be printed either in assembled or unassembled form. For instance, different sections of the product may be printed separately (as a kit of unassembled parts) and then subsequently assembled. Alternatively, the different parts may be printed in assembled form.

In light of the above, embodiments include methods of manufacture via additive manufacturing. This includes the steps of obtaining a design file representing the product and instructing an additive manufacturing apparatus to manufacture the product in assembled or unassembled form according to the design file. The additive manufacturing apparatus may include a processor that is configured to automatically convert the design file into computer executable instructions for controlling the manufacture of the product. In these embodiments, the design file itself can automatically cause the production of the product once input into the additive manufacturing device. Accordingly, in this embodiment, the design file itself may be considered computer executable instructions that cause the additive manufacturing apparatus to manufacture the product. Alternatively, the design file may be converted into instructions by an external computing system, with the resulting computer executable instructions being provided to the additive manufacturing device.

Given the above, the design and manufacture of implementations of the subject matter and the operations described in this specification can be realized using digital electronic circuitry, or in computer software, firmware, or hardware, including the structures disclosed in this specification and their structural equivalents, or in combinations of one or more of them. For instance, hardware may include processors, microprocessors, electronic circuitry, electronic components, integrated circuits, etc. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or other manufacturing technology.

The described and illustrated embodiments are to be considered as illustrative and not restrictive in character, it being understood that only preferred embodiments have been shown and described and that all changes and modifications that come within the scope of the inventions as defined in the claims are desired to be protected. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

Optional and/or preferred features as set out herein may be used either individually or in combination with each other where appropriate and particularly in the combinations as set out in the accompanying claims. The optional and/or preferred features for each aspect of the invention set out herein are also applicable to any other aspects of the invention, where appropriate.

The invention claimed is:

1. A vane arrangement for a compressor, the vane arrangement comprising:
   an annular vane deck, extending at least partway around a longitudinal axis, defining a deck thickness b in the axial direction; and
   at least one vane which projects from a first surface of the vane deck, the at least one vane comprising:
      a leading edge proximate the longitudinal axis, the leading edge defined by a fillet;
      a trailing edge distal the longitudinal axis; and
      first and second pressure surfaces which extend between the leading edge and the trailing edge;
   wherein the at least one vane defines a neck thickness t, at a widest point of the fillet between the first and second pressure surfaces and perpendicular to a point on a camber line defined between the leading edge and the trailing edge, in a plane normal to the longitudinal axis; and
   wherein $$\frac{t}{b} \geq 0.21.$$

2. The vane arrangement according to claim 1, wherein:

$$0.21 \leq \frac{t}{b} \leq 0.38.$$

3. The vane arrangement according to claim 1, wherein $$\frac{t}{b} \geq 0.27.$$

4. The vane arrangement according to claim 3, wherein $$0.27 \leq \frac{t}{b} \leq 0.37.$$

5. The vane arrangement according to claim 1, wherein the at least one vane defines:
 a chord length l defined by least one of a first straight line distance between the leading edge and the trailing edge, a second straight line distance between a first midpoint of a first thickness of the leading edge and a second midpoint of a second thickness of the trailing edge, and a linear offset between the leading edge and the trailing edge;
 wherein the leading edge defines a leading edge angle Ø, the leading edge angle Ø being an angle of inclination of the camber line, in the plane normal to the longitudinal axis, at the leading edge, relative to a radial line extending through the leading edge; and
 wherein: 11≤t(l cos Ø)≤about 25, each of neck thickness t and chord length l are defined by the same measurement unit.

6. The vane arrangement according to claim 5, wherein 16≤t(l cos Ø)≤24.

7. A compressor, the compressor comprising:
 a compressor cover;
 a compressor wheel comprising a plurality of blades, a radially outermost point of the plurality of blades defining a wheel diameter d, the compressor wheel being rotatable about the longitudinal axis and received by the compressor cover; and
 the vane arrangement according to any preceding claim 5; wherein $$\frac{t}{bd} \geq 0.0014,$$

each of neck thickness t, deck thickness b, chord length l, and wheel diameter d are defined by the same measurement unit.

8. The compressor according to claim 7, wherein:

$$0.0014 \leq \frac{t}{bd} \leq 0.0026.$$

9. The compressor according to claim 7, wherein $$\frac{t}{bd} \geq 0.0018.$$

10. The compressor according to claim 9, wherein $$0.0018 \leq \frac{t}{bd} \leq 0.0025.$$

11. The compressor according to claim 9, wherein:

$$0.1 \leq \frac{t(l \cos \emptyset)}{d} \leq 0.16.$$

12. The compressor according to claim 7, wherein:

$$0.069 \leq \frac{t(l \cos \emptyset)}{d} \leq 0.17.$$

13. A turbocharger comprising:
 the compressor according to claim 7;
 a turbine comprising a turbine housing and a turbine impeller; and
 a support member;
 wherein the compressor wheel and turbine wheel are in power communication with one another.

14. A method of designing the vane arrangement according to claim 5, wherein the method comprises:
 adjusting:
  the neck thickness t; and/or
  the leading edge angle Ø; and/or
  the chord length l;
 such that 11≤t(l cos Ø)≤25.

15. The vane arrangement according to claim 1, wherein the vane arrangement forms part of a vane insert.

16. A compressor cover for a turbomachine, the compressor cover comprising:
 the vane arrangement according to claim 1, wherein the at least one vane is integrally formed with the compressor cover.

17. A method of manufacturing a device via additive manufacturing, the method comprising:
 obtaining an electronic file representing a geometry of a product wherein the product is a vane arrangement according to claim 1; and
 controlling an additive manufacturing apparatus to manufacture, over one or more additive manufacturing steps, the product according to the geometry specified in the electronic file.

18. A method of manufacturing a vane arrangement according to claim 1, wherein the method comprises: utilizing an additive manufacturing method, wherein successive layers of material are provided on each other to form the vane arrangement.

19. A method of designing the vane arrangement according to claim 1, wherein the method comprises:
 adjusting:
  the deck thickness b; and/or
  the neck thickness t;
 such that $$\frac{t}{b} \geq 0.21.$$

20. The vane arrangement of claim 1, wherein a profile of the at least one vane in a plane normal to a longitudinal axis is defined by the Cartesian coordinate X and Y values of the plot data or normalised data of Table 1.

21. A vane arrangement for a compressor, the vane arrangement comprising:
- an annular vane deck, extending at least partway around a longitudinal axis; and
- at least one vane which projects from a first surface of the vane deck, the at least one vane comprising:
  - a leading edge proximate the longitudinal axis, the leading edge defined by a fillet, the leading edge defining a leading edge angle Ø;
  - a trailing edge distal the longitudinal axis, a camber line being defined between the leading edge and trailing edge; and
  - first and second pressure surfaces which extend between the leading edge and the trailing edge;
- wherein the at least one vane defines a chord length l, the chord length l defined by least one of a first straight line distance between the leading edge and the trailing edge, a second straight line distance between a first midpoint of a first thickness of the leading edge and a second midpoint of a second thickness of the trailing edge, and a linear offset between the leading edge and the trailing edge;
- wherein the at least one vane defines a camber line between the leading edge and trailing edge;
- wherein the at least one vane further defines a neck thickness t, at a widest point of the fillet between the first and second pressure surfaces and perpendicular to a point on the camber line, in a plane normal to the longitudinal axis;
- wherein the leading edge angle Ø is an angle of inclination of the camber line, in the plane normal to the longitudinal axis, at the leading edge, relative to a radial line extending through the leading edge; and
- wherein: $11 \leq t(l \cos \emptyset) \leq 25$.

22. A compressor, the compressor comprising:
- a compressor cover;
- a compressor wheel comprising a plurality of blades, a radially outermost point of the plurality of blades defining a wheel diameter d, the compressor wheel being received by the compressor cover; and
- the vane arrangement according to claim 21;
- wherein:

$$0.1 \leq \frac{t(l \cos \emptyset)}{d} \leq 0.16.$$

23. A vane for a vane arrangement, the vane having a profile, in a plane normal to a longitudinal axis, defined by the Cartesian coordinate X and Y values of the plot data or normalized data of Table 1.

* * * * *